United States Patent
Raveendran et al.

(10) Patent No.: US 9,197,912 B2
(45) Date of Patent: Nov. 24, 2015

(54) CONTENT CLASSIFICATION FOR MULTIMEDIA PROCESSING

(75) Inventors: Vijayalakshmi R. Raveendran, San Diego, CA (US); Phanikumar Bhamidipati, San Diego, CA (US); Gordon Kent Walker, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2261 days.

(21) Appl. No.: 11/373,577

(22) Filed: Mar. 10, 2006

(65) Prior Publication Data

US 2006/0222078 A1    Oct. 5, 2006

Related U.S. Application Data

(60) Provisional application No. 60/660,677, filed on Mar. 10, 2005.

(51) Int. Cl.
*G06K 9/36* (2006.01)
*H04N 7/12* (2006.01)
(Continued)

(52) U.S. Cl.
CPC ......... *H04N 21/2365* (2013.01); *H04N 19/103* (2013.01); *H04N 19/107* (2013.01); *H04N 19/115* (2013.01); *H04N 19/137* (2013.01); *H04N 19/139* (2013.01); *H04N 19/14* (2013.01); *H04N 19/142* (2013.01); *H04N 19/147* (2013.01); *H04N 19/149* (2013.01); *H04N 19/154* (2013.01); *H04N 19/172* (2013.01); *H04N 19/176* (2013.01);
(Continued)

(58) Field of Classification Search
CPC ............... H04N 19/00381; H04N 21/2365
See application file for complete search history.

(56) References Cited

U.S. PATENT DOCUMENTS

| | | | |
|---|---|---|---|
| 5,289,276 A | 2/1994 | Siracusa et al. | |
| 5,404,174 A | 4/1995 | Sugahara | |

(Continued)

FOREIGN PATENT DOCUMENTS

| | | |
|---|---|---|
| CL | 1473-2005 | 12/2001 |
| CL | 14732005 | 12/2001 |

(Continued)

OTHER PUBLICATIONS

International Search Report—PCT/US2006/00848, International Search Authority-European Patent Office—Jul. 17, 2007.

(Continued)

*Primary Examiner* — Steven H Nguyen
(74) *Attorney, Agent, or Firm* — Dang Vo; Elaine H. Lo

(57) ABSTRACT

An apparatus and method for processing multimedia data, such as, for example, video data, audio data, or both video and audio data for encoding utilizing a determined content classification is claimed. Processing the multimedia data includes determining complexity of multimedia data, classifying the multimedia data based on the determined complexity, and, determining a bit rate for encoding the multimedia data based on its classification. The complexity can include a spatial complexity component and a temporal complexity component of the multimedia data. The multimedia data is classified using content classifications, which are based on a visual quality value for viewing multimedia data, using the spatial complexity, the temporal complexity, or both the spatial complexity and temporal complexity.

32 Claims, 11 Drawing Sheets

(51) Int. Cl.

| | | |
|---|---|---|
| *H04N 21/2365* | (2011.01) | |
| *H04N 21/434* | (2011.01) | |
| *H04N 19/139* | (2014.01) | |
| *H04N 19/176* | (2014.01) | |
| *H04N 19/147* | (2014.01) | |
| *H04N 19/172* | (2014.01) | |
| *H04N 19/196* | (2014.01) | |
| *H04N 19/149* | (2014.01) | |
| *H04N 19/115* | (2014.01) | |
| *H04N 19/61* | (2014.01) | |
| *H04N 19/103* | (2014.01) | |
| *H04N 19/107* | (2014.01) | |
| *H04N 19/14* | (2014.01) | |
| *H04N 19/137* | (2014.01) | |
| *H04N 19/142* | (2014.01) | |
| *H04N 19/154* | (2014.01) | |
| *H04N 19/177* | (2014.01) | |
| *H04N 19/44* | (2014.01) | |
| *H04N 19/57* | (2014.01) | |
| *H04N 19/87* | (2014.01) | |

(52) U.S. Cl.
CPC .......... *H04N 19/177* (2013.01); *H04N 19/196* (2013.01); *H04N 19/198* (2013.01); *H04N 19/44* (2013.01); *H04N 19/57* (2013.01); *H04N 19/61* (2013.01); *H04N 19/87* (2013.01); *H04N 21/4347* (2013.01)

(56) References Cited

U.S. PATENT DOCUMENTS

| | | | |
|---|---|---|---|
| 5,508,752 A | 4/1996 | Kim et al. | |
| 5,565,920 A | 10/1996 | Lee et al. | |
| 5,598,428 A | 1/1997 | Sato | |
| 5,619,272 A | 4/1997 | Salmon et al. | |
| 5,642,294 A | 6/1997 | Taniguchi et al. | |
| 5,642,460 A | 6/1997 | Shimoda | |
| 5,654,805 A | 8/1997 | Boon | |
| 5,682,204 A | 10/1997 | Uz et al. | |
| 5,684,917 A | 11/1997 | Yanagihara et al. | |
| 5,686,962 A * | 11/1997 | Chung et al. | 375/240.16 |
| 5,699,119 A | 12/1997 | Chung et al. | |
| 5,745,645 A | 4/1998 | Nakamura et al. | |
| 5,754,233 A | 5/1998 | Takashima | |
| 5,771,357 A | 6/1998 | Kato et al. | |
| 5,790,179 A | 8/1998 | Shibata et al. | |
| 5,793,895 A | 8/1998 | Chang et al. | |
| 5,801,765 A | 9/1998 | Gotoh et al. | |
| 5,821,991 A | 10/1998 | Kwok | |
| 5,835,163 A | 11/1998 | Liou et al. | |
| 5,841,939 A | 11/1998 | Takahashi et al. | |
| 5,864,369 A | 1/1999 | Swan | |
| 5,929,902 A | 7/1999 | Kwok | |
| 5,960,148 A | 9/1999 | Miyazawa | |
| 5,978,029 A * | 11/1999 | Boice et al. | 375/240.14 |
| 5,991,502 A | 11/1999 | Kawakami et al. | |
| 6,012,091 A | 1/2000 | Boyce | |
| 6,014,493 A | 1/2000 | Shimoda | |
| 6,064,796 A | 5/2000 | Nakamura et al. | |
| 6,091,460 A | 7/2000 | Hatano et al. | |
| 6,115,499 A | 9/2000 | Wang et al. | |
| 6,157,674 A | 12/2000 | Oda et al. | |
| 6,175,593 B1 | 1/2001 | Kim et al. | |
| 6,229,925 B1 * | 5/2001 | Alexandre et al. | 382/239 |
| 6,317,518 B1 | 11/2001 | Enari | |
| 6,333,950 B1 | 12/2001 | Karasawa | |
| 6,363,114 B1 | 3/2002 | Kato | |
| 6,370,672 B1 | 4/2002 | Rick et al. | |
| 6,449,002 B1 | 9/2002 | Markman et al. | |
| 6,473,459 B1 | 10/2002 | Sugano et al. | |
| 6,490,320 B1 | 12/2002 | Vetro et al. | |
| 6,501,796 B1 | 12/2002 | Dusseux et al. | |
| 6,507,618 B1 | 1/2003 | Wee et al. | |
| 6,538,688 B1 | 3/2003 | Giles | |
| 6,539,220 B1 | 3/2003 | Sakai et al. | |
| 6,553,068 B1 | 4/2003 | Wake et al. | |
| 6,574,211 B2 | 6/2003 | Padovani | |
| 6,580,829 B1 | 6/2003 | Hurst, Jr. et al. | |
| 6,600,836 B1 | 7/2003 | Morely et al. | |
| 6,718,121 B1 | 4/2004 | Shikunami | |
| 6,721,492 B1 | 4/2004 | Togashi | |
| 6,724,819 B1 | 4/2004 | Takaki et al. | |
| 6,744,474 B2 | 6/2004 | Markman | |
| 6,773,437 B2 | 8/2004 | Ogilvie et al. | |
| 6,784,942 B2 | 8/2004 | Selby et al. | |
| 6,791,602 B1 | 9/2004 | Sasaki et al. | |
| 6,798,834 B1 | 9/2004 | Murakami et al. | |
| 6,891,891 B2 | 5/2005 | Pau et al. | |
| 6,900,846 B2 | 5/2005 | Lee et al. | |
| 6,904,081 B2 | 6/2005 | Frank | |
| 6,909,745 B1 | 6/2005 | Puri et al. | |
| 6,928,151 B2 | 8/2005 | Yamada et al. | |
| 6,934,335 B2 | 8/2005 | Liu et al. | |
| 6,952,500 B2 * | 10/2005 | Sheraizin et al. | 382/239 |
| 6,959,044 B1 | 10/2005 | Jin et al. | |
| 6,970,506 B2 | 11/2005 | Kim et al. | |
| 6,985,635 B2 | 1/2006 | Chen et al. | |
| 6,987,728 B2 | 1/2006 | Deshpande | |
| 6,996,186 B2 | 2/2006 | Ngai et al. | |
| 7,009,656 B2 | 3/2006 | Thomson et al. | |
| 7,027,512 B2 | 4/2006 | Jeon | |
| 7,039,855 B2 | 5/2006 | Nikitin et al. | |
| 7,042,512 B2 | 5/2006 | Yang et al. | |
| 7,075,581 B1 | 7/2006 | Ozgen et al. | |
| 7,089,313 B2 | 8/2006 | Lee et al. | |
| 7,093,028 B1 | 8/2006 | Shao et al. | |
| 7,095,874 B2 | 8/2006 | Moskowitz et al. | |
| 7,123,816 B2 | 10/2006 | McGrath et al. | |
| 7,129,990 B2 | 10/2006 | Wredenhagen et al. | |
| 7,136,417 B2 | 11/2006 | Rodriguez | |
| 7,139,551 B2 | 11/2006 | Jamadagni | |
| 7,154,555 B2 | 12/2006 | Conklin | |
| 7,167,507 B2 | 1/2007 | Mailaender et al. | |
| 7,203,236 B2 | 4/2007 | Yamada | |
| 7,203,238 B2 | 4/2007 | Liu et al. | |
| 7,356,073 B2 | 4/2008 | Heikkila | |
| 7,359,466 B2 | 4/2008 | Huang et al. | |
| 7,430,336 B2 | 9/2008 | Raveendran | |
| 7,433,982 B2 | 10/2008 | Peev et al. | |
| 7,443,448 B2 | 10/2008 | Yang et al. | |
| 7,474,701 B2 * | 1/2009 | Boice et al. | 375/240.26 |
| 7,479,978 B2 | 1/2009 | Cho et al. | |
| 7,483,581 B2 | 1/2009 | Raveendran et al. | |
| 7,486,736 B2 | 2/2009 | Zhidkov | |
| 7,528,887 B2 | 5/2009 | Wyman | |
| 7,529,426 B2 | 5/2009 | Neuman | |
| 7,536,626 B2 | 5/2009 | Agrawal et al. | |
| 7,557,861 B2 | 7/2009 | Wyman et al. | |
| 7,634,260 B2 | 12/2009 | Chun | |
| 7,660,987 B2 | 2/2010 | Baylis et al. | |
| 7,676,106 B2 | 3/2010 | Panusopone et al. | |
| 7,705,913 B2 | 4/2010 | Jia et al. | |
| 7,738,716 B2 | 6/2010 | Song | |
| 7,840,112 B2 | 11/2010 | Rao | |
| 7,949,205 B2 | 5/2011 | De et al. | |
| 8,060,720 B2 | 11/2011 | Uppala | |
| 2001/0001614 A1 | 5/2001 | Boice et al. | |
| 2001/0017888 A1 | 8/2001 | Bruls | |
| 2001/0055337 A1 | 12/2001 | Matsuzaki et al. | |
| 2002/0021485 A1 | 2/2002 | Pilossof | |
| 2002/0036705 A1 | 3/2002 | Lee et al. | |
| 2002/0037051 A1 | 3/2002 | Takenaka | |
| 2002/0047936 A1 | 4/2002 | Tojo | |
| 2002/0054621 A1 | 5/2002 | Kyeong et al. | |
| 2002/0097791 A1 | 7/2002 | Hansen | |
| 2002/0146071 A1 | 10/2002 | Liu et al. | |
| 2002/0149703 A1 | 10/2002 | Adams et al. | |
| 2002/0154705 A1 | 10/2002 | Walton et al. | |
| 2002/0163964 A1 | 11/2002 | Nichols | |
| 2003/0021485 A1 | 1/2003 | Raveendran et al. | |
| 2003/0118097 A1 | 6/2003 | Chen et al. | |

(56) References Cited

U.S. PATENT DOCUMENTS

| | | |
|---|---|---|
| 2003/0142762 A1 | 7/2003 | Burke |
| 2003/0169933 A1* | 9/2003 | Song et al. .................... 382/239 |
| 2003/0185302 A1 | 10/2003 | Abrams |
| 2003/0219160 A1 | 11/2003 | Song et al. |
| 2003/0227977 A1 | 12/2003 | Henocq |
| 2004/0013196 A1 | 1/2004 | Takagi et al. |
| 2004/0045038 A1 | 3/2004 | Duff et al. |
| 2004/0073901 A1 | 4/2004 | Imamatsu |
| 2004/0125877 A1 | 7/2004 | Chang et al. |
| 2004/0136566 A1 | 7/2004 | Cho et al. |
| 2004/0190609 A1 | 9/2004 | Watanabe |
| 2004/0192274 A1 | 9/2004 | Vuori |
| 2004/0264790 A1 | 12/2004 | Song et al. |
| 2005/0022178 A1 | 1/2005 | Ghafoor et al. |
| 2005/0062885 A1 | 3/2005 | Kadono et al. |
| 2005/0063473 A1 | 3/2005 | Koyama et al. |
| 2005/0063500 A1 | 3/2005 | Li et al. |
| 2005/0076057 A1 | 4/2005 | Sharma et al. |
| 2005/0078750 A1 | 4/2005 | Shen et al. |
| 2005/0081482 A1 | 4/2005 | Lembo |
| 2005/0134735 A1 | 6/2005 | Swartz |
| 2005/0168634 A1 | 8/2005 | Wyman et al. |
| 2005/0168656 A1 | 8/2005 | Wyman et al. |
| 2005/0185719 A1 | 8/2005 | Hannuksela |
| 2005/0192878 A1 | 9/2005 | Minear et al. |
| 2005/0195889 A1 | 9/2005 | Grant et al. |
| 2005/0195899 A1 | 9/2005 | Han |
| 2005/0201478 A1 | 9/2005 | Claussen et al. |
| 2005/0222961 A1 | 10/2005 | Staib et al. |
| 2005/0231635 A1 | 10/2005 | Lin |
| 2005/0249282 A1 | 11/2005 | Landsiedel et al. |
| 2005/0254692 A1 | 11/2005 | Caldwell |
| 2005/0265461 A1 | 12/2005 | Raveendran |
| 2006/0002340 A1 | 1/2006 | Criss et al. |
| 2006/0023788 A1 | 2/2006 | Otsuka et al. |
| 2006/0129646 A1 | 6/2006 | Rhee et al. |
| 2006/0133514 A1 | 6/2006 | Walker |
| 2006/0146934 A1 | 7/2006 | Caglar et al. |
| 2006/0153294 A1 | 7/2006 | Wang et al. |
| 2006/0159160 A1 | 7/2006 | Kim et al. |
| 2006/0166739 A1 | 7/2006 | Lin |
| 2006/0197879 A1 | 9/2006 | Covell et al. |
| 2006/0210184 A1 | 9/2006 | Song et al. |
| 2006/0215539 A1 | 9/2006 | Vrcelj et al. |
| 2006/0215761 A1 | 9/2006 | Shi et al. |
| 2006/0230162 A1 | 10/2006 | Chen et al. |
| 2006/0233239 A1 | 10/2006 | Sethi et al. |
| 2006/0239347 A1 | 10/2006 | Koul |
| 2006/0244840 A1 | 11/2006 | Eshet et al. |
| 2006/0282737 A1 | 12/2006 | Shi et al. |
| 2007/0014354 A1 | 1/2007 | Murakami et al. |
| 2007/0074266 A1 | 3/2007 | Raveendran et al. |
| 2007/0081586 A1 | 4/2007 | Raveendran et al. |
| 2007/0081587 A1 | 4/2007 | Raveendran et al. |
| 2007/0081588 A1 | 4/2007 | Raveendran et al. |
| 2007/0097259 A1 | 5/2007 | MacInnis et al. |
| 2007/0124443 A1 | 5/2007 | Nanda et al. |
| 2007/0124459 A1 | 5/2007 | Kasama |
| 2007/0160128 A1 | 7/2007 | Tian et al. |
| 2007/0160142 A1 | 7/2007 | Abrams, Jr. |
| 2007/0171280 A1 | 7/2007 | Raveendran et al. |
| 2007/0171972 A1 | 7/2007 | Tian et al. |
| 2007/0171986 A1 | 7/2007 | Hannuksela |
| 2007/0206117 A1 | 9/2007 | Tian et al. |
| 2007/0208557 A1 | 9/2007 | Li et al. |
| 2007/0252894 A1 | 11/2007 | Satou et al. |
| 2008/0151101 A1 | 6/2008 | Tian et al. |
| 2009/0074070 A1 | 3/2009 | Yin et al. |
| 2009/0092944 A1 | 4/2009 | Pirker |
| 2009/0122186 A1 | 5/2009 | Rodriguez et al. |
| 2009/0168880 A1 | 7/2009 | Jeon et al. |
| 2009/0244840 A1 | 10/2009 | Takawa et al. |
| 2010/0020886 A1 | 1/2010 | Raveendran et al. |
| 2010/0171814 A1 | 7/2010 | Routhier et al. |
| 2013/0308707 A1 | 11/2013 | Raveendran et al. |

FOREIGN PATENT DOCUMENTS

| | | |
|---|---|---|
| CL | 133-2005 | 10/2005 |
| CL | 1332005 | 10/2005 |
| CL | 1043-2005 | 12/2005 |
| CL | 1045-2005 | 12/2005 |
| CL | 10432005 | 12/2005 |
| CL | 10452005 | 12/2005 |
| CL | 205-2001 | 1/2006 |
| CL | 2052001 | 1/2006 |
| CL | 543-2006 | 9/2006 |
| CL | 5432006 | 9/2006 |
| CL | 536-2006 | 11/2006 |
| CL | 540-2006 | 11/2006 |
| CL | 542-2006 | 11/2006 |
| CL | 5392006 | 11/2006 |
| CL | 5402006 | 11/2006 |
| CL | 5422006 | 11/2006 |
| CL | 544-2006 | 2/2007 |
| CL | 5442006 | 2/2007 |
| CN | 1328747 A | 12/2001 |
| CN | 1355995 A | 6/2002 |
| CN | 1372769 | 10/2002 |
| CN | 1383327 A | 12/2002 |
| CN | 1395800 A | 2/2003 |
| CN | 1436423 A | 8/2003 |
| CN | 1520185 A | 8/2004 |
| CN | 1623332 A | 6/2005 |
| CN | 1647540 A | 7/2005 |
| CN | 1669314 A | 9/2005 |
| EP | 0626789 A2 | 11/1994 |
| EP | 0644695 | 3/1995 |
| EP | 0690617 | 1/1996 |
| EP | 0547460 | 6/1996 |
| EP | 0946054 | 9/1999 |
| EP | 1005227 | 5/2000 |
| EP | 1022667 A2 | 7/2000 |
| EP | 1164792 | 12/2001 |
| EP | 1168731 A1 | 1/2002 |
| EP | 1195992 A1 | 4/2002 |
| EP | 1209624 A1 | 5/2002 |
| EP | 1265373 A2 | 12/2002 |
| EP | 1289182 A2 | 3/2003 |
| EP | 1505488 A1 | 2/2005 |
| EP | 1547016 A1 | 6/2005 |
| EP | 1615447 A1 | 1/2006 |
| EP | 1657835 A1 | 5/2006 |
| FR | 2646047 A1 | 10/1990 |
| JP | 3189292 A | 8/1991 |
| JP | 5064175 A | 3/1993 |
| JP | H05344492 A | 12/1993 |
| JP | H0622298 A | 1/1994 |
| JP | H06339115 A | 12/1994 |
| JP | H07135657 A | 5/1995 |
| JP | 7222145 A | 8/1995 |
| JP | H07203433 A | 8/1995 |
| JP | 7298272 A | 11/1995 |
| JP | 7312756 A | 11/1995 |
| JP | 8046969 A | 2/1996 |
| JP | 08102938 | 4/1996 |
| JP | 8130716 A | 5/1996 |
| JP | 08214210 | 8/1996 |
| JP | 8251594 A | 9/1996 |
| JP | 09018782 | 1/1997 |
| JP | H09503890 A | 4/1997 |
| JP | 09284770 | 10/1997 |
| JP | 10013826 A | 1/1998 |
| JP | 10302396 A | 11/1998 |
| JP | 10313463 A | 11/1998 |
| JP | H114260 A | 1/1999 |
| JP | 11243547 A | 9/1999 |
| JP | 11316843 A | 11/1999 |
| JP | 2000032474 A | 1/2000 |
| JP | 2000059774 A | 2/2000 |
| JP | 2000115778 | 4/2000 |
| JP | 2000209553 A | 7/2000 |
| JP | 2000287173 A | 10/2000 |
| JP | 2000295626 | 10/2000 |
| JP | 2000350217 A | 12/2000 |

(56) References Cited

FOREIGN PATENT DOCUMENTS

| | | |
|---|---|---|
| JP | 2001045494 A | 2/2001 |
| JP | 2001169251 A | 6/2001 |
| JP | 3189292 B2 | 7/2001 |
| JP | 2001204026 A | 7/2001 |
| JP | 2001251629 A | 9/2001 |
| JP | 2001346207 A | 12/2001 |
| JP | 2001346214 A | 12/2001 |
| JP | 2002010259 A | 1/2002 |
| JP | 2002044668 A | 2/2002 |
| JP | 2002051336 A | 2/2002 |
| JP | 2002064817 A | 2/2002 |
| JP | 2002077833 A | 3/2002 |
| JP | 2002101416 A | 4/2002 |
| JP | 2002125227 A | 4/2002 |
| JP | 2002252834 A | 9/2002 |
| JP | 2002543714 T | 12/2002 |
| JP | 2003037844 A | 2/2003 |
| JP | 2003110474 A | 4/2003 |
| JP | 2003111079 A | 4/2003 |
| JP | 2003209837 A | 7/2003 |
| JP | 2003209848 A | 7/2003 |
| JP | 2003224847 A | 8/2003 |
| JP | 2003319341 A | 11/2003 |
| JP | 2003348583 A | 12/2003 |
| JP | 2004023288 A | 1/2004 |
| JP | 2004140488 A | 5/2004 |
| JP | 2004248124 A | 9/2004 |
| JP | 2005123732 A | 5/2005 |
| JP | 2005517342 A | 6/2005 |
| JP | 2006074684 A | 3/2006 |
| JP | 2007520126 T | 7/2007 |
| JP | 2008500935 A | 1/2008 |
| KR | 1020010099660 | 11/2001 |
| KR | 20020010171 A | 2/2002 |
| KR | 20020070199 A | 9/2002 |
| KR | 20030029507 A | 4/2003 |
| KR | 100389893 B1 | 6/2003 |
| KR | 20030073254 A | 9/2003 |
| KR | 1020040046320 | 6/2004 |
| KR | 20050089721 A | 9/2005 |
| KR | 20060011281 A | 2/2006 |
| TW | 536918 B | 6/2003 |
| WO | 95/35628 A1 | 12/1995 |
| WO | 9739577 | 10/1997 |
| WO | 9932993 A1 | 7/1999 |
| WO | 99/43157 A1 | 8/1999 |
| WO | 0067486 | 11/2000 |
| WO | WO0156298 | 8/2001 |
| WO | 0166936 A1 | 9/2001 |
| WO | WO0169936 | 9/2001 |
| WO | 0178389 A1 | 10/2001 |
| WO | WO0178398 A1 | 10/2001 |
| WO | WO0225925 | 3/2002 |
| WO | WO0243398 | 5/2002 |
| WO | 02/087255 A2 | 10/2002 |
| WO | 03052695 A2 | 6/2003 |
| WO | 03067778 A1 | 8/2003 |
| WO | WO2004008747 A2 | 1/2004 |
| WO | WO2004008757 A1 | 1/2004 |
| WO | 2004/019273 A1 | 3/2004 |
| WO | 0019726 | 4/2004 |
| WO | 2004/054270 A1 | 6/2004 |
| WO | WO2004049722 A1 | 6/2004 |
| WO | WO2004057460 A2 | 7/2004 |
| WO | WO2004070953 A2 | 8/2004 |
| WO | WO2004114667 A1 | 12/2004 |
| WO | WO2004114672 | 12/2004 |
| WO | WO2005006764 A1 | 1/2005 |
| WO | WO2005069917 | 8/2005 |
| WO | WO2005074147 A1 | 8/2005 |
| WO | WO2005081482 A1 | 9/2005 |
| WO | WO2005107266 | 11/2005 |
| WO | WO2005109900 | 11/2005 |
| WO | 2006099082 A2 | 9/2006 |
| WO | WO2006099242 | 9/2006 |
| WO | WO2007047755 | 4/2007 |

OTHER PUBLICATIONS

International Preliminary Report on Patentability—PCT/US2006/008484, International Search Authority—The International Bureau of WIPO, Geneva, Switzerland—Sep. 12, 2007.

Written Opinion—PCT/US2006/008484, International Search Authority—European Patent Office—Jul. 17, 2007.

"MPEG Digital Video-Coding Standards," IEEE Signal Processing Magazine, IEEE Service Center, Piscataway, NJ, vol. 14, No. 5, Sep. 1997, pp. 82-100, XP011089789.

C. Huang et al.: "A Robust Scene-Change Detection method for Video Segmentation," IEEE Transactions on Circuits and Systems for Video Technology, vol. 11, No. 12, p. 1281-1288, Dec. 2001.

D. Lelescu et al.: "Statistical Sequential Analysis for Real-Time Video Scene Change Detection on Compressed Multimedia Bitstream," IEEE Transactions on Multimedia, vol. 5, No. 1, pp. 106-117, Mar. 2003.

D.L. Donoho et al.: "Ideal spatial adaptation by wavelet shrinkage," Biometrika, vol. 8, pp. 1-30, 1994.

F.M. Wang et al.: "Time recursive Deinterlacing for IDTV and Pyramid Coding," Signal Processing: Image Communications 2, pp. 1306-1309, 1990.

G.D. Haan et al.: "De-interlacing of video data," IEEE Transactions on Consumer Electronics, vol. 43, No. 3, pp. 1-7, 1997.

Girod et al., "Scalable codec architectures for Internet video-on-demand," Signals, Systems & Computers, 1997 Conference Record of the Thirty-First Asilomar Conference on Pacific Grove, CA, USA Nov. 2-5, 1997, Los Alamitos, CA, USA, IEEE Comput Soc. US. vo.

K. Jung et al.: "Deinterlacing using Edge based Motion Estimation," IEEE MWSCS, pp. 892-895, 1995.

Kwon et al., "Overview of H.264/MPEG-4 part 10," Journal of visual Communication and Image Representation, Academic Press, Inc., vol. 17, No. 2, Apr. 2006, pp. 186-216, XP005312621.

Lee J, "A fast frame type selection technique for very low bit rate coding using MPEG-1" Real-Time Imaging, Academic Press Limited GB, vol. 5, No. 2, Apr. 1999, pp. 83-94, XP004429625.

Mihaela Van Der Schaar et al., A Hybrid Temporal-Snr Fine-Granular Scalability for Internet Video, IEEE Transaction on Circuits and Systems for Video Technology, IEEE Service Center, vol. 11, No. 3, Mar. 2001, XP011014178.

P. Haavisto et al.: "Scan rate up-conversions using adaptive weighted median filtering," Signal Processing of HDTV II, Elsevier Science Publishers, pp. 703-710, 1990.

R. Simonetti et al., "Deinterlacing of HDTV Images for Multimedia Applications," Signal Processing of HDTV IV, Elesevier Science Publishers, pp. 765-772, 1993.

Rusert et al., "Enhanced interference wavelet video coding considering the interrelation of spatio-temporal transform and motion compensation," Signal Processing. Image Communication, Elsevier Science Publishers, vol. 19, No. 7, Aug. 2004, pp. 617-635, XP00004524456.

S. Lee et al.: "Fast Scene Change Detection using Direct Feature Extraction from MPEG Compressed Videos," IEEE Transactions on Multimedia, vol. 2, No. 4, pp. 240-254, Dec. 2000.

S. Pei et al.: "Effective Wipe Detection in MPEG Compressed Video Using Macroblock Type Information," IEEE Transactions on Multimedia, vol. 4, No. 3, pp. 309-319, Sep. 2002.

S.P. Ghael et al.: "Improvement Wavelet denoising via empirical Wiener filtering," Proceedings of SPIE, vol. 3169, pp. 1-11, Jul. 1997.

SMPTE RP 27.3.-1989 "SMPTE Recommended Practice Specifications for Safe Action and Safe Title Areas Test Pattern for Television Systems" Society of Motion Picture and Television Engineers, pp. 1-3 Approved Mar. 29, 1989.

International Search Report—PCT/US2006/008484, International Search Authority—European Patent Office—Jul. 17, 2007.

Liang, Y. & Tan, Y. P., "A new content-based hybrid video transcoding method," 2001 International Conference on Image Processing, Oct. 7-10, 2001, vol. 1, pp. 429-432.

(56) References Cited

OTHER PUBLICATIONS

Wiegand, T. et al., "Draft ITU-R recommendation and final draft international standard of Joint Video Specification" Joint Video Team (JVT) of ISO/IEC MPEG & ITU-T VCEG. 8th Meeting: Geneva, Switzerland. May 27, 2003.
European Search Report—EP08000729—Search Authority—The Hague—Jun. 15, 2010.
Mailaender, L., et al., "Linear MIMO equalization for CDMA downlink signals with code reuse", Wireless Communications, IEEE Transactions on, Sep. 2005, vol. 4, Issue 5, pp. 2423-2434.
R4-030797, An Advanced Receiver Proposal for MIMO, TSG-RAN WG4 #28, Lucent Technologies, Sophia-Antipolis, Aug. 18-22, 2003, pp. 1-8.
Puri et al., "Video coding using the H.264/MPEG-4 AVC compression standard" Signal Processing. Image Communication, Elsevier Science Publishers, Amsterdam, NL, vol. 19, No. 9, Oct. 1, 2004, pp. 793-849, XP004607150.
De Haan Gerard, et al., "Deinterlacing—An Overview," Proceeding of the IEEE, 1998, 86 (9), 1839-1857.
Boyce, Jill M.: "Packet loss resilient transmission of MPEG video over the Internet" Signal Processing: Image Communication, Elsevier Science Publishers, Amsterdam, NL, vol. 15, No. 1-2, Sep. 1999, pp. 7-24, XP004180635.
3GPP2-C10-20040607-102, "Third Generation Partnership Project 2", TSG-C Working Group 1.2—Multimedia Services, Montreal, Quebec, Canada, May 17-20, 2004, Qualcomm.
Taiwan Search Report—TW095108342—TIPO—May 1, 2012.
Fablet R., et al., "Motion Recognition Using Nonparametric Image Motion Models Estimated From Temporal and Multiscale Co-Occurence Statistics", IEEE Transaction on Pattern analysis and machine Intelligence, vol. 25, No. 12, pp. 1619-1624, Dec. 2003.
Peh C.H., et al., "Synergizing Spatial and Temporal Texture", IEEE Transaction on Image Processing, vol. 11, No. 10, pp. 1179-1191, Oct. 2002.

\* cited by examiner

|          | LOW | MEDIUM | HIGH |
|----------|-----|--------|------|
| HIGH     | HL 5 | HM 6 | HH 8 (CLASS) |
| MEDIUM   | ML 2 | MM 3 | MH 7 |
| LOW      | LL 1 | LM 2 | LH 4 |

MOTION (rows) / TEXTURE (columns)

FIG. 6

CONTENT CLASSIFICATION FOR MULTIMEDIA PROCESSING

CLAIM OF PRIORITY UNDER 35 U.S.C. §119

The present application for patent claims priority under 35 U.S.C. §119(e) to Provisional Application No. 60/660,677, filed Mar. 10, 2005, and assigned to the assignee hereof and hereby expressly incorporated by reference.

I. BACKGROUND

A. Field of the Invention

The field of the invention relates to multimedia data processing by compression algorithms to analyze, classify, quantify and represent multimedia data based upon the content of the multimedia data.

B. Description of the Related Technology

Widespread use of the Internet and wireless communication has increased demand for multimedia services that stream media over the Internet and mobile/wireless channels. In Internet Protocol (IP) networks, multimedia data can be provided by a server and can be streamed by one or more wired or wireless clients. Wired connections include dial-up, integrated services digital network (ISDN), cable, digital subscriber line protocols (collectively referred to as xDSL), fiber, local area networks (LAN), wide area networks (WAN) and others. Electronic devices utilizing wireless communications include telephones (e.g., cell phones), personal data assistants (PDAs), hand-held and portable computers and others. In most, if not all of these applications, bandwidth requirements and/or restrictions necessitate that multimedia data processing utilize a source encoder incorporating multimedia compression algorithms to analyze, quantify and represent multimedia data to convey the maximum information by expending a "minimum" number of bits. Characteristics of such algorithms vary significantly which leads to large scale variations in their performance (such as compression efficiency and bit rate). Characteristics of multimedia processing using compressions algorithms can vary significantly based on content, which can lead to large scale variations in their performance (such as compression efficiency and bit rate).

Some multimedia data processing schemes use certain types of information to classify the multimedia data. Typically, image classification algorithms are based on some form of image segmentation methods. Image clustering algorithms have been proposed in MPEG for MPEG-7 (photo clustering). Image classification algorithms currently proposed and described in literature have been based on mathematical and statistical aspects of the multimedia data. Improved methods and devices for processing and encoding multimedia data could have a wide range of applications in both wired and wireless communications, and it would be beneficial in the art to utilize and/or modify the characteristics of such processing so that its features can be exploited in improving existing products and creating new products that have not yet been developed.

II. SUMMARY

Each of the inventive apparatuses and methods has several aspects, no single one of which is solely responsible for its desirable attributes. Without limiting the scope of this invention, its more prominent features will now be discussed briefly. After considering this discussion, and particularly after reading the section entitled "Detailed Description" one would understand how the features of the improvements for multimedia data processing apparatuses and methods.

In one aspect, a method of processing multimedia data includes determining complexity of multimedia data, classifying the multimedia data based on the determined complexity, and determining a bit rate for encoding the multimedia data based on its classification. The method can also include determining spatial complexity and temporal complexity of the multimedia data, and classifying the multimedia data can include associating the spatial complexity with a texture value, associating the temporal complexity with a motion value, and assigning a content classification to the multimedia data based on the texture value and the motion value.

In another aspect, an apparatus for processing multimedia data includes means for determining complexity of multimedia data, means for classifying the multimedia data based on the determined complexity, and means for determining a bit rate for encoding the multimedia data based on its classification.

In another aspect, a device configured to process multimedia data includes a processor configured to determine complexity of multimedia data, configured to classify the multimedia data based on the determined complexity, and further configured to determine a bit rate for encoding the multimedia data based on its classification.

In another aspect, a computer readable medium for embodying a method for processing multimedia data includes determining complexity of multimedia data, classifying multimedia data based on the determined complexity, and determining a bit rate for encoding the multimedia data based on its classification.

In another aspect, an apparatus for processing multimedia data includes a first determiner to determine complexity of multimedia data, a content classifier to classify the multimedia data based on the determined complexity, and a second determiner for determining a bit rate for encoding the multimedia data based on its classification. In some aspects, the complexity includes a spatial complexity of the multimedia data and/or a temporal complexity of the multimedia data, and the classification of the multimedia data can be based on the spatial complexity and/or the temporal complexity.

In yet other aspects a method and apparatus for processing multimedia data comprises method or means for determining complexity of multimedia data; and classifying the multimedia data based on the determined complexity. A method and apparatus for processing multimedia data may comprise method or means for determining complexity of multimedia data; and selecting from at least one multimedia processes based on the determined complexity. A method and apparatus for processing multimedia data may comprise method or means for determining complexity of multimedia data; and selecting a set of encoding processes based on the complexity of the multimedia data. A method and apparatus for processing multimedia data may comprise method or means for classifying the multimedia data based on the determined complexity; and determining a bit rate for encoding the multimedia data based on its classification. A method and apparatus for processing multimedia data may comprise method or means for determining complexity of multimedia data; and selecting a set of decoding processes based on the complexity of the multimedia data. A method and apparatus for processing multimedia data may comprise method or means for determining complexity of multimedia data; classifying the multimedia data based on the determined complexity; and selecting a set of decoding processes based on the classification of the multimedia data. It should be noted that the method and apparatus may be implemented by a computer readable medium and/a processor.

III. BRIEF DESCRIPTION OF THE DRAWINGS

FIG. 1 is a block diagram of a general communications system for encoding and decoding streaming multimedia data, FIG. 2 is a diagram illustrating a conventional MPEG-4 Simple Profile data stream, FIG. 3 is an illustration of an example of a P Frame construction process in MPEG-4, FIG. 4 is a block diagram of a content classifying component, FIG. 5 is a schematic of a group of macroblocks in a video frame illustrating mean values for each macroblock, FIG. 6 is a chart illustrating an example of image classification based on a texture and a motion value, FIG. 7 is a graph illustrating examples of determining a bit rate using content classification curves and a visually perceived quality value, FIG. 8 is a flowchart illustrating a process for classifying multimedia data, and FIG. 9 is a flowchart illustrating a process for encoding multimedia data based on its content classification.

IV. DETAILED DESCRIPTION

Figure 1:
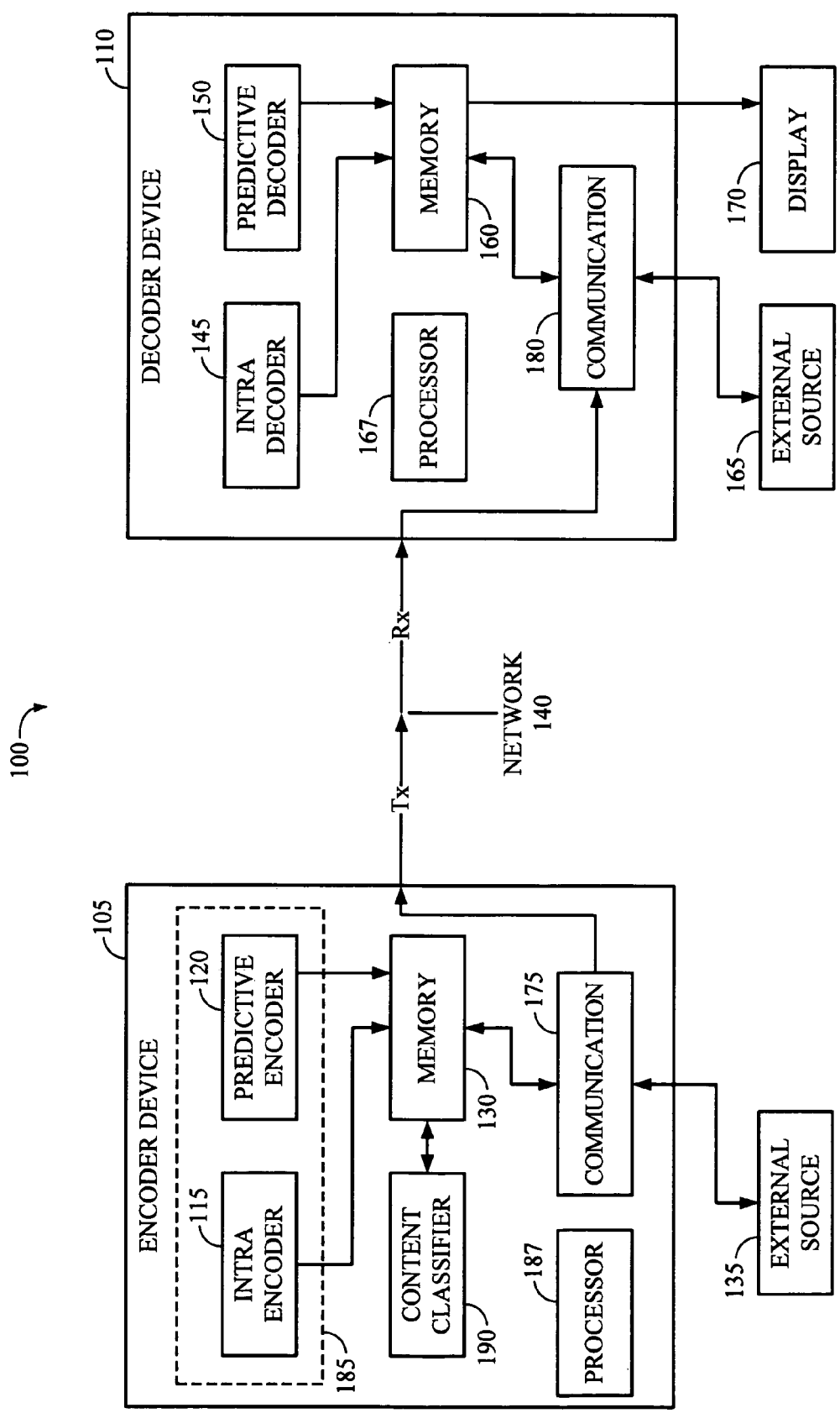

The following detailed description is directed to certain embodiments that may be used. However, the disclosed embodiments can be embodied in a multitude of different ways. Reference in this specification to "one embodiment" or "an embodiment" means that a particular feature, structure, or characteristic described in connection with the embodiment is included in at least one embodiment. The appearances of the phrase "in one embodiment," "according to one embodiment," or "in some embodiments" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The following description includes details to provide a thorough understanding of the examples. However, it is understood by one of ordinary skill in the art that the examples may be practiced even if every detail of a process or device in an example or embodiment is not described or illustrated herein. For example, electrical components may be shown in block diagrams that do not illustrate every electrical connection or every electrical element of the component in order not to obscure the examples in unnecessary detail. In other instances, such components, other structures and techniques may be shown in detail to further explain the examples.

Examples of apparatus and methods for encoding multimedia data that utilize classifying the multimedia data into categories based on its content (e.g., one or more content classifications) are described herein. The methods and apparatus described offer techniques for encoding multimedia data based on determining spatial and temporal characteristics of the multimedia data, and classifying the multimedia data based on one or more of its complexity characteristics. These methods and apparatus enable multimedia data processing and compression algorithms to be "tuned" based on the content category of the multimedia data to optimize the method and apparatus used to encode multimedia data using content information and efficiently deliver a desired quality level of multimedia data as perceived by the human eye, or another measure of the quality level.

"Multimedia data," as used herein, is a broad term that includes video data (which can include audio data), audio data, or both video data and audio data. "Video data" or "video" as used herein as a broad term, referring to sequences of images containing text or image information and/or audio data, and can be used to refer to multimedia data (e.g., the terms can be used interchangeably) unless otherwise specified.

Multimedia codec systems generally do not take into account the different types of content. Instead, encoding is done in a similar fashion for all the content types. Typically, multimedia data is encoded at either a constant quality or a constant bit rate. Encoding at a constant bit rate leads to discrepancies in the quality of the video encoded for low activity sections and high activity sections. For example, a news sequence containing a sports clip may be encoded with the same number of bits allocated for each section. When viewed, the sports clip section would be perceived to be at a lower quality than the talking head section and the overall results may not be acceptable. Encoding at a constant quality leads to inefficient use of bit rates. Encoding low activity video at a high quality uses an unnecessarily high bit rate resulting in wasted bandwidth. By classifying multimedia data based on the texture and motion in a video sequence, rather than on merely the general type of content in the sequence, the bit rate can be adjusted over the sequence based on the actual textured motion for that particular data. Content classification can be used in a variety of applications that can result in better bit management and more intelligent use of the available bit budget. For example, in some embodiments one content classification can be used for video data scene-change detection.

Communication of Multimedia Data

Multimedia data communicated to a client device is typically compressed. A pair of video coding standards, known as MPEG-x and H.26x, describe data processing and manipulation techniques (referred to herein as hybrid coding) that are well suited to the compression and delivery of video, audio and other information using fixed or variable length source coding techniques. In particular, the above-referenced standards, and other hybrid coding standards and techniques, compress, illustratively, multimedia information using intra-frame coding techniques (such as, for example, run-length coding, Huffman coding and the like) and inter-frame coding techniques (such as, for example, forward and backward predictive coding, motion compensation and the like). Specifically, in the case of multimedia processing systems, hybrid multimedia coding systems are characterized by prediction-based compression encoding of multimedia frames with intra- and/or inter-frame motion compensation encoding. Encoding based at least in part on content classification can be incorporated into such compression algorithms to further optimize multimedia processing. Although the examples described herein are written towards the video coding standards MPEG and H.26x, the similar use of other video coding standards are also applicable.

Intra-frame coding refers to encoding a picture (a field or a frame) without reference to any other picture, but the Intra-coded picture can be used as a reference for other pictures. The terms intra-frame, intra-coded frame and I Frame are all examples of video-objects formed with intra-coding that are used throughout this application.

Inter or predictive coding refers to encoding a picture (a field or a frame) with reference to another picture. Compared to the Intra-coded picture, the Inter-coded or predicted picture may be coded with greater efficiency. Examples of inter-coded pictures that will be used throughout this application are predicted frames (either forward or backward predicted, also referred to as P frames), and bi-directional predicted frames (also referred to as B Frames). Other terms for inter-coding include high-pass coding, residual coding, motion compensated interpolation and others that are well known to those of ordinary skill in the art.

A technique, known as scalable coding, can divide Intra-coded pictures and the different inter-coded pictures (such as P Frames or B Frames) into different layers in the bitstream such as, for example, a base layer and an enhancement layer. Scalable coding, is useful in dynamic channels, where scalable bitstreams can be adapted to match fluctuations in network bandwidth. In error-prone channels, scalable coding can add robustness through unequal error protection of the base layer and the enhancement layer. Better error protection can be applied to the more important layer.

Encoding Multimedia Data

FIG. 1 is a block diagram of a general communications system for classifying the content of multimedia data, encoding, communicating, and decoding such data. The system 100 includes encoder device 105 and decoder device 110. Encoder device 105 includes encoder component 185 which includes intra encoder component 115, and predictive encoder component 120. Encoder device 105 further includes memory component 130, communications component 175, and content classifier component 190. Encoder device 105 is able to receive data from external source 135 using communication logic contained in communications component 175. External source 135 could be, for example, external memory, the Internet, a live video and/or audio feed, and receiving the data can include wired and/or wireless communications. The data contained in external source 135 can be in a raw (not encoded) format or encoded state. Intra encoder component 115 is used to encode intra-coded portions of frames (slices, macroblocks and sub-macroblocks). Predictive encoder component 120 is used to encode predicted portions of frames, including forward prediction, backward prediction and bi-directional prediction. After encoding, the encoded frames are stored in memory component 130 or external memory. The external memory can be contained within external source 135 or a separate memory component (not shown).

The encoder device 105 includes a processor 187 which is in communication with the memory component 130 and one or more of the other components in encoder device 105. The processor 187 can perform processing for any of the other components of the encoder and can contain a main encoding process. In some embodiments, the processor 187 may not be a separate component (as shown) but instead the processor functionality can be incorporated into one or more of the other components of the encoder 105.

Communications component 175 contains logic used for data transmission (Tx) in conjunction with network 140. Network 140 can be part of a wired system such as telephone, cable, and fiber optic, or a wireless system. In the case of wireless, communication systems, network 140 can comprise, for example, part of a code division multiple access (CDMA or CDMA2000) communication system or alternately, the system can be a frequency division multiple access (FDMA) system, an orthogonal frequency division multiplex (OFDM) system, a time division multiple access (TDMA) system such as GSM/GPRS (General Packet Radio Service)/EDGE (enhanced data GSM environment) or TETRA (Terrestrial Trunked Radio) mobile telephone technology for the service industry, a wideband code division multiple access (WCDMA), a high data rate (1xEV-DO or 1xEV-DO Gold Multicast) system, or in general any wireless communication system employing a combination of techniques. The encoded frames are transmitted (Tx) over network 140. The encoding processes performed by encoder device 105 are more fully described below.

Content classifying component 190 contains logic for determining a classification of the data content of multimedia data received from the external source 135. To classify the multimedia data, a human visual model may be used to quantify the sensitivity of the human eye to perturbations in luminance of a visual signal with respect to its spatial and/or temporal context in the image and/or motion image sequence. Spatial and temporal masking effects of the eye are also taken into consideration. One aspect includes using motion estimation or block matching algorithms to represent the temporal aspects of the video. Information relating to the multimedia data, e.g., spatial and temporal complexity values of the video data, can be determined by one or more components of the encoder 105 and used in conjunction with the perceptibility of spatial and motion effects in video are used to classify content of the video data into two or more categories. Such classification can be used in pre-/post processing and compression (e.g. scene-change detection, rate control, FRUC) algorithms. Content classification provides the encoder 105 with a reliable estimate of what type of content to expect in upcoming video data (e.g., a superframe), so the encoder 105 can determine the appropriate bit rate allocation to achieve a particular level of visually perceived quality based on the content classification, and for other frame-type decision purposes. A superframe is a set of media data for a predetermined time period or window, typically equal to one second worth of data, that are used as a unit for determining the content class, transmitting and for any other purposes. The content classifications can be based on characteristics of multimedia data as perceived by the human eye, for example, spatial complexity and temporal complexity. Multimedia processing algorithms can be optimized for various content types and provide stability and control with respect to their performance in encoding and communicating the multimedia data.

Encoder component 185 can provide processing information (e.g., of macroblocks) for use by the content classifying component 190. For example, the encoder component 185 can calculate information from the multimedia data, including a human visual sensitivity metric such as a $D_{csat}$ value, contrast ration value, motion vectors (MVs), and the sum of the absolute pixel differences (SADs). The encoder component 185 can store this information to the memory component 130 so it is available to be retrieved by the content classifying component 190 to determine the spatial and temporal complexity of the multimedia data, determine, the texture and motion of the data, and then determine the resulting content classification. In another aspect, the content classifying component 190, or another component such as processor 187 calculates at least part of this information from the multimedia data.

Decoding Process

Decoder device 110 contains similar components to some of the components in the encoder device 105, including, intra decoder component 145, predictive decoder component 150, memory component 160, processor 167, and communications component 180. Decoder device 110 receives encoded data that has been transmitted over network 140 or from external storage 165. Communications component 180 contains logic used for receiving (Rx) encoded data in conjunction with network 140, as well as logic for receiving encoded data from external storage 165. External storage 165 could be, for example, external RAM or ROM, or a remote server. Intra decoder component 145 is used to decode intra-coded data. Predictive decoder component 150 is used to decode inter-coded data. The processor 167 is in communication with the memory component 160 and one or more of the other components in decoder device 110. The processor 167 can perform processing for any of the other components of the decoder and can contain a main decoding process. Predictive decoder component 150 decodes both P frames (forward or backward predicted) as well as B frames. The same sub-components used for decoding P frames can be utilized in series to decode B frames with multiple references. Multiple references for B frames can be in forward and backward reference frames, both in the same reference frame, both in separate forward reference frames or both in backward reference frames.

After decoding, the decoded frames can be displayed with display component 170 or stored in internal memory 160 or external storage 165. Display component 170 can be an integrated part of the decoding device that contains such parts as video display hardware and logic, including a display screen, or it can be an external peripheral device. The decoding processes performed by decoder device 110 are more fully described below.

Encoding Example—MPEG

Figures 2, 5:
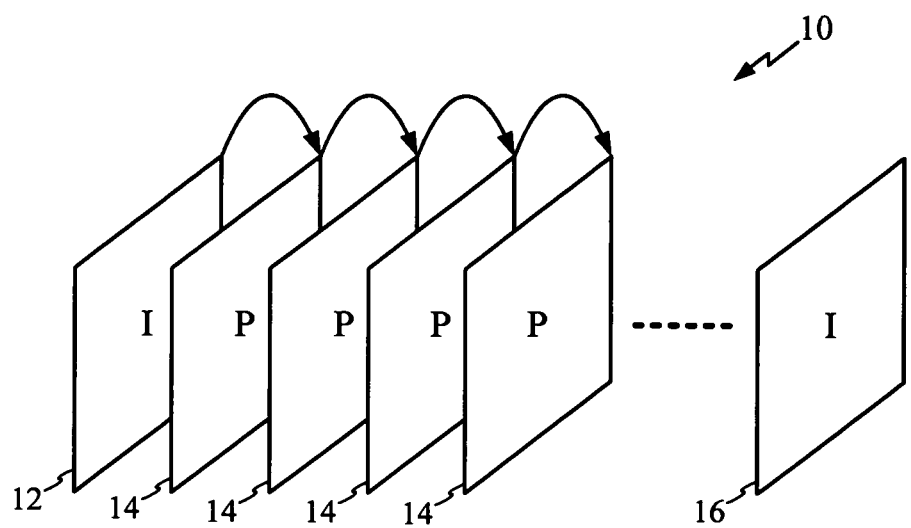

In a typical MPEG decoder, predictive coded pixel blocks (e.g., blocks that comprise one or more motion vectors and a residual error component) are decoded with respect to a reference frame (where an intra-frame or another predicted frame can serve as a reference frame). FIG. 2 is a diagram illustrating a conventional MPEG-4 Simple Profile data stream, which depicts frame dependencies for a Group of Pictures (GOP). GOP 10 is made up of initial I Frame 12, followed by several forward predicted P frames 14. Due to the dependency of P frames on a previous I or P frame, loss of any of the P frames 14 may result in a loss of information that may be crucial in decoding other P frames. P frame loss or removal may result in, for example, video jitter or the inability of the decoder to continue decoding until the next I frame 16, which marks the beginning of the next GOP.

P Frames (or any inter-coded sections) can exploit temporal redundancy between a region in a current picture and a best matching prediction region in a reference picture. The difference between the current region and the best matching reference prediction region is known as residual error (or prediction error). The location of the best matching prediction region in the reference frame can be encoded in a motion vector. The processor 167 can perform processing for any of the other components of the decoder 110 and can contain a main decoding process. In some embodiments, the processor 167 may not be a separate component, but instead the processor functionality can be incorporated into one or more of the other components of the decoder 110.

Figure 3:
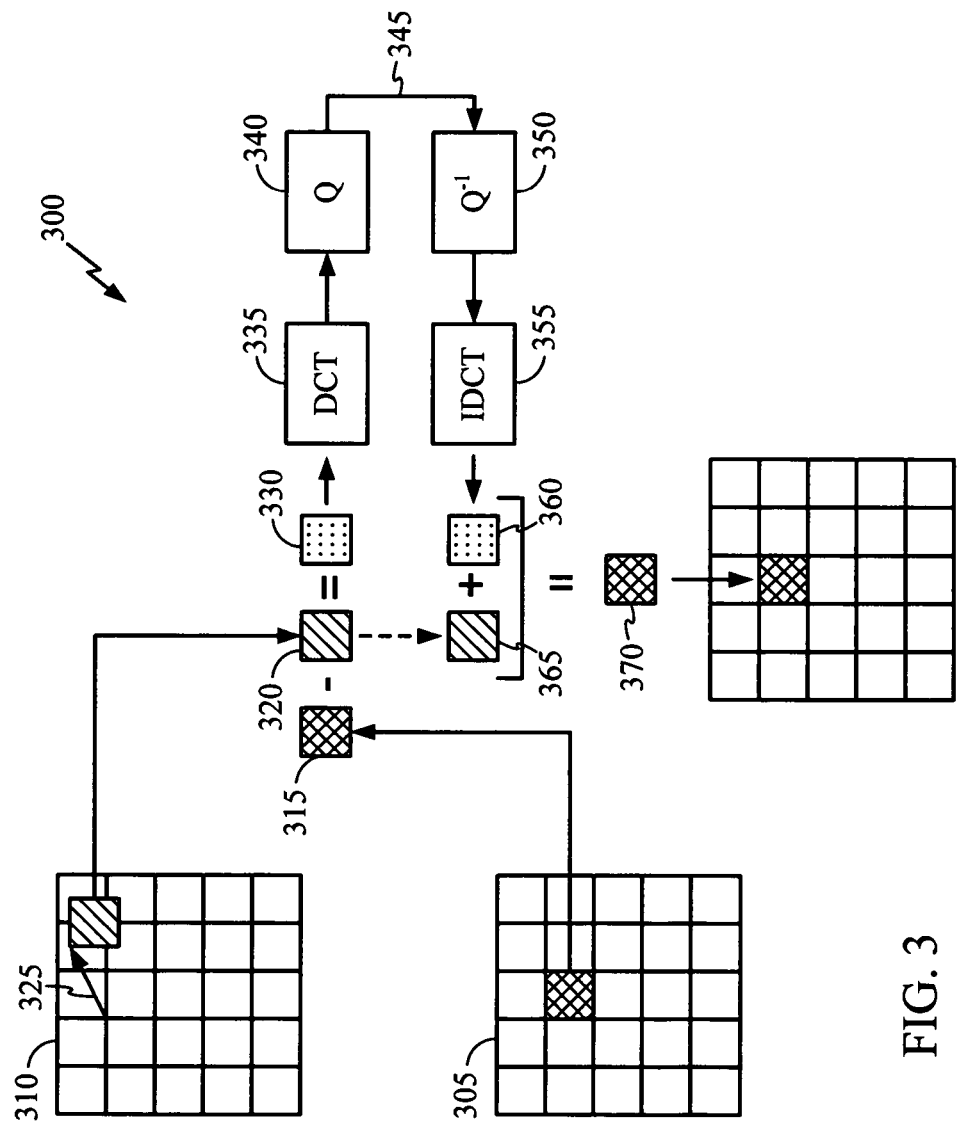

FIG. 3 is an illustration of an example of a P Frame construction process in, for example, MPEG-4. Process 300 includes current picture 305 made up of 5×5 macroblocks, where the number of macroblocks in this example is arbitrary. A macroblock is a group of associated pixels, and in this example is made up of 16×16 pixels. Pixels can be defined by an 8-bit luminance value (Y) and two 8-bit chrominance values (Cr and Cb). In MPEG, Y, Cr and Cb components can be stored in a 4:2:0 format, where the Cr and Cb components are down-sampled by 2 in the X and the Y directions. Hence, each macroblock would consist of 256 Y components, 64 Cr components and 64 Cb components.

Macroblock 315 of current picture 305 is predicted from reference picture 310 at a different time point than current picture 305. A search is made in reference picture 310 to locate best matching macroblock 320 that is closest, in terms of Y, Cr and Cb values to current macroblock 315 being encoded. Methods of searching for best matching macroblock 320, known by those of ordinary skill in the art, include a) minimizing SAD (sum of absolute pixel differences) between current macroblock 315 and reference picture 310 macroblocks, b) minimizing SSD (sum of squared pixel differences), and c) minimum cost in a rate distortion sense, and others. The location of best matching macroblock 320 in reference picture 310 is encoded in motion vector 325. Reference picture 310 can be an I Frame or P Frame that the decoder would have reconstructed prior to the construction of current picture 305. Best matching macroblock 320 is subtracted from current macroblock 315 (a difference for each of the Y, Cr and Cb components is calculated) resulting in residual error 330. Residual error 330 is encoded with 2D Discrete Cosine Transform (DCT) 335 and then quantized 340.

Quantization 340 can be performed to provide spatial compression by, for example, allotting fewer bits to the high frequency coefficients while allotting more bits to the low frequency coefficients. The quantized coefficients of residual error 330, along with motion vector 325 and reference picture 310 identifying information, are encoded information representing current macroblock 315. The encoded information can be stored in memory for future use or operated on for purposes of, for example, error correction or image enhancement, or transmitted over network 345.

The encoded quantized coefficients of residual error 330, along with encoded motion vector 325 can be used to reconstruct current macroblock 315 in the encoder for use as part of a reference frame for subsequent motion estimation and compensation. The encoder can emulate the procedures of a decoder for this P Frame reconstruction. The emulation of the decoder can result in both the encoder and decoder working with the same reference picture. The reconstruction process, whether done in an encoder, for further inter-coding, or in a decoder, is presented here. Reconstruction of a P Frame can be started after the reference frame (or a portion of a picture or frame that is being referenced) is reconstructed. The encoded quantized coefficients are dequantized 350 and then 2D Inverse DCT, or IDCT, 355 is performed resulting in decoded or reconstructed residual error 360. Encoded motion vector 325 is used to locate the already reconstructed best matching macroblock 365 in the already reconstructed reference picture 310. Reconstructed residual error 360 is then added to reconstructed best matching macroblock 365 to form reconstructed macroblock 370. Reconstructed macroblock 370 can be stored in memory, displayed independently or in a picture with other reconstructed macroblocks, or processed further for image enhancement.

Content Classification of Multimedia Data

Figure 4:
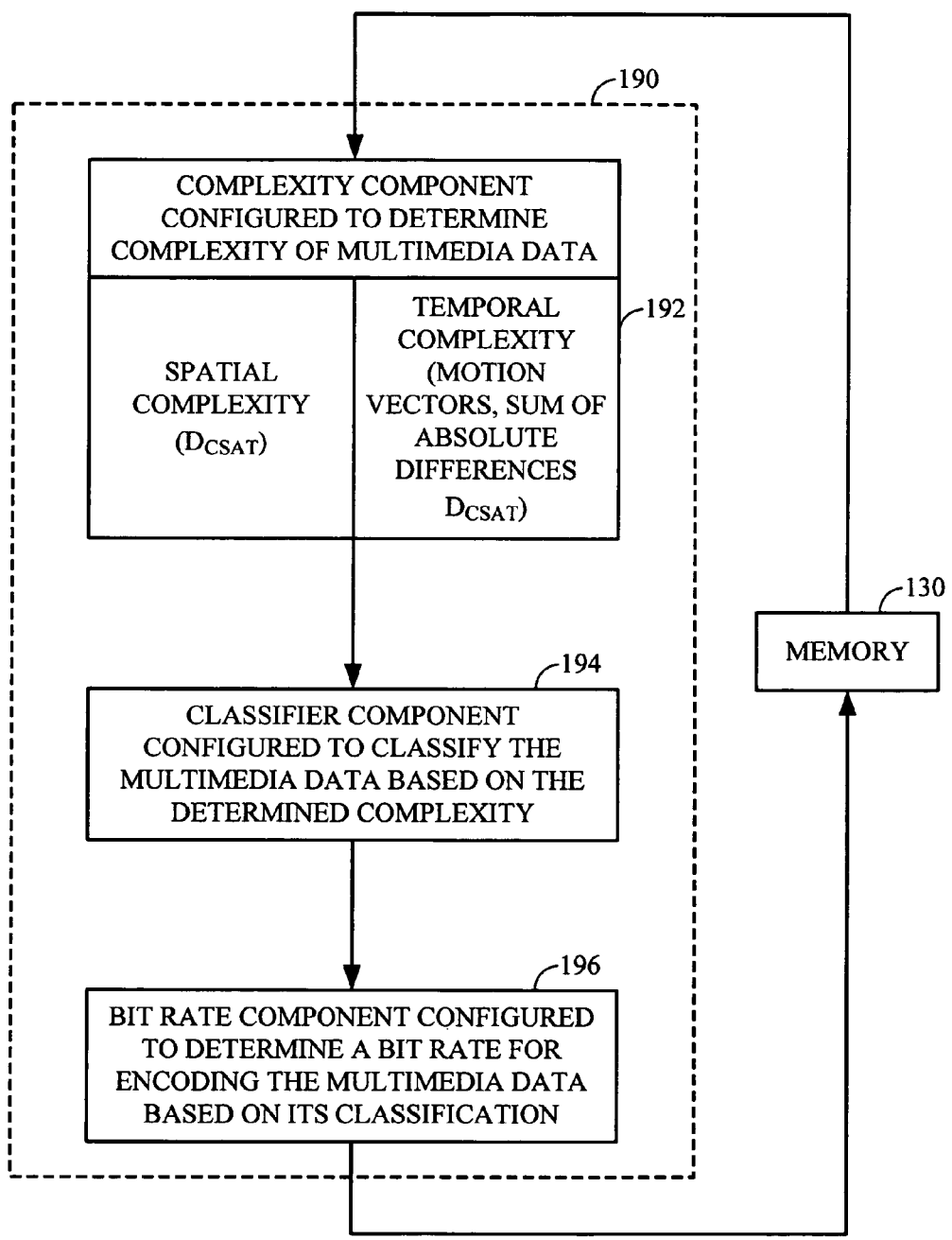

FIG. 4 is a block diagram of a content classifying component 190 illustrated in FIG. 1. The content classifying component 190 includes a complexity component 192 configured to determine spatial complexity and temporal complexity of multimedia data, and also to associate a texture value to the spatial complexity and a motion value to the temporal complexity. For multimedia data being encoded, the content classifying component 190 retrieves preprocessed information relating to the contents of the data from the memory 130. This information can include, for example, one or more $D_{csat}$ values, contrast ratio values, motion vectors (MVs), and sum of absolute differences (SADs). In aspects where this information is not determined by a preprocessor (for example, the encoder component 185 or processor 187 in FIG. 1), the classifying component 190 can include functionality to calculate this information.

In general, multimedia data includes one or more sequences of images, or frames. Each frame can be broken up into blocks of pixels for processing. Spatial complexity is a broad term which generally describes a measure of the level of spatial details within a frame. Scenes with mainly plain or unchanging or low changing areas of luminance and chrominance may have low spatial complexity. The spatial complexity is associated with the texture of the video data. Spatial complexity is based on, in this aspect, a human visual sensitivity metric called $D_{csat}$, which is calculated for each block as a function of local spatial frequency and ambient lighting. Ordinary skilled artisans are aware of techniques for using spatial frequency patterns and lighting and contrast characteristics of visual images to take advantage of the human visual system. A number of sensitivity metrics are known for taking advantage of the perspective limitations of the human visual system and could be used with method described herein.

Temporal complexity is a broad term which is used to generally describe a measure of the level of motion in multimedia data as referenced between frames in a sequence of frames. Scenes (e.g., sequences of frames of video data) with little or no motion have a low temporal complexity. Temporal complexity can be calculated for each macroblock, and can be based on the $D_{csat}$ value, motion vectors and the sum of absolute pixel differences between one frame and another frame (e.g., a reference frame).

Scene Change Detection

Scene Change detection is a necessary step for any video coding system for it to intelligently conserve bits without wasting bits by inserting an I frame at a fixed interval. The following description shows how a scene change can be detected and its consequent use in the content classification.

The length of a GOP can be long enough to reduce the efficient loss from big I frames, and short enough to fight mismatch between encoder and decoder, or channel impairment. In addition, macro blocks (MB) in P frames can be INTRA coded for the same reason.

In a practical streaming video system, the communication channel is usually impaired by bit errors or packet losses. Where to place I frames or I MBs may significantly impact decoded video quality and viewing experience. A rule of thumb is to use INTRA coding for pictures or portions of pictures that has significant change from collocated previous pictures or picture portions. These regions cannot be predicted effectively and efficiently with motion estimation. Therefore, they may be exempted from INTER coding techniques. In the context of channel impairment, those regions are likely to suffer from error propagation. INTRA coding can be used to reduce error propagation.

The regions that need to be INTRA updated can be classified as three categories.

(1) Abrupt scene changes: This category includes frames that are significantly different from the previous frame, usually caused by a camera operation. Since the content of these frames is different from that of the previous frame, the abrupt scene change frames can be encoded as I frames.

(2) Cross fading and other slow scene changes: This category includes slow switching of scenes, usually caused by computer processing of camera shots. Gradual blending of two different scenes may look more pleasing to human eyes, but poses a challenge to video coding. Motion compensation cannot reduce the bitrate of those frames effectively. More INTRA MBs need to be updated for these frames.

(3) Camera flashlights. Camera flashlights shift the luminance of a picture suddenly and swiftly. Usually the duration of a camera flashlight is shorter than the temporal masking duration of the human vision system (HVS), which is typically defined to be 44 ms. Human eyes are not sensitive to the quality of these short bursts of brightness and therefore they can be encoded coarsely. Because the flashlight frames cannot be handled effectively with motion compensation and they are bad prediction candidate for future frames, coarse encoding of these frames does not reduce the encoding efficiency of future frames.

When any of the above frames are detected, a shot event is declared. Shot detection is not only useful to improve encoding quality; it can also aid video content search/indexing. One detection algorithm is described hereinbelow.

Figure 11:
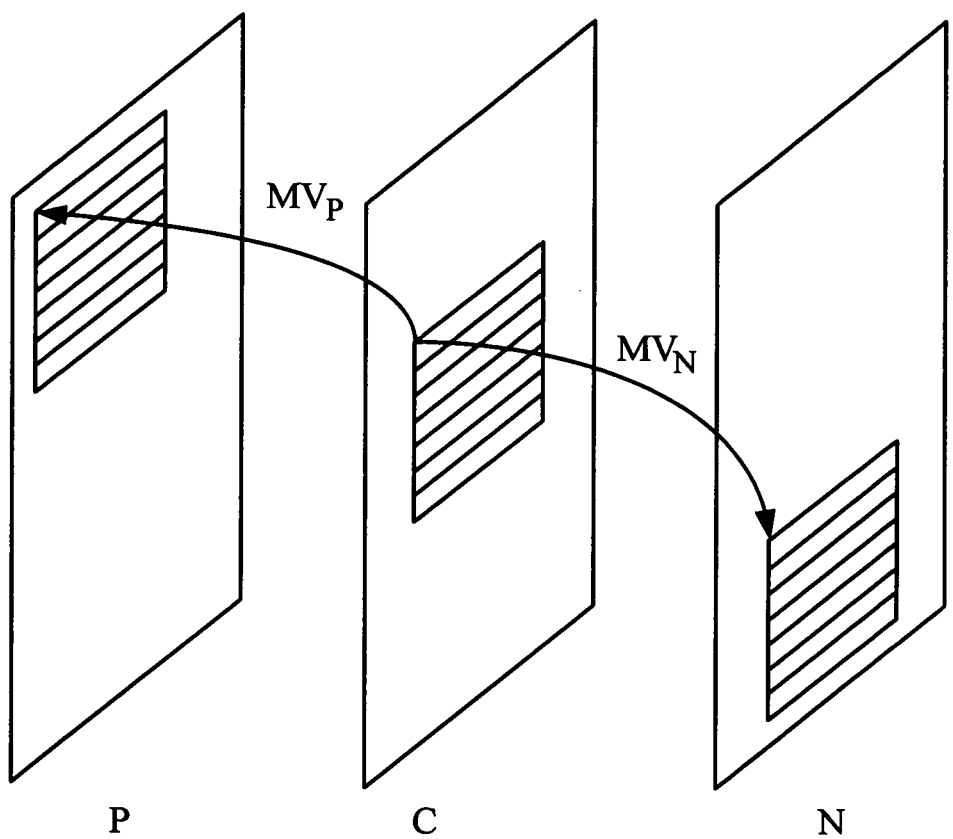
FIG. 11 is a diagram illustrating motion compensation.

The sequence is preprocessed with a bi-directional motion compensator. It matches every 8×8 block of the current frame with blocks in two of this frames most adjacent neighboring frames, one in the past, and one in the future, as illustrated in FIG. 11. The motion compensator produces motion vectors and difference metrics for every block. The difference metric can be sum of square difference (SSD) or sum of absolute difference (SAD). Without loss of generality, we use SAD as an example in this document.

For every frame, an SAD ratio is calculated as below:

$$\gamma = \frac{\varepsilon + SAD_P}{\varepsilon + SAD_N} \qquad \text{(Eq. 1)}$$

where $SAD_P$ and $SAD_N$ are the SAD of the forward and the backward difference metric respectively. It should be noted that the denominator contains a small positive number $\varepsilon$ to prevent the "divide-by-zero" error. The nominator also contains an $\varepsilon$ to balance the effect of the unity in the denominator. For example, if the previous frame, the current frame, and the next frame are identical, motion search yields $SAD_P = SAD_N = 0$. In this case, the above calculation generators $\gamma = 1$ instead of 0 or infinity.

We also find the luminance histogram of every frame. Normally we deal with images whose luminance depth is eight bits. For this luminance depth, we can set the number of bins to be 16 to obtain the histogram. The next metric evaluates the histogram difference $$\lambda = \frac{\sum_{i=1}^{16} |N_{Pi} - N_{Ci}|}{N} \qquad \text{(Eq. 2)}$$

where $N_{Pi}$ is the number of blocks in the $i^{th}$ bin for the previous frame, and $N_{Ci}$ is the number of blocks in the $i^{th}$ bin for the current frame, and N is the total number of blocks in a frame. Obviously, if the histogram of the previous and the current frame are disjoint, then $\lambda = 2$.

An abrupt scene change frame is declared if the next criterion is satisfied, as illustrated in Eq. 3:

$$M = \frac{\gamma_C}{\gamma_P} + A\lambda(2\lambda+1) \geq T_1 \qquad \text{(Eq. 3)}$$

where A is a constant chosen by application, and $T_1$ is a threshold. Our simulation shows that A=1, and $T_1$=5 achieve good detection performance. If the current frame is an abrupt scene change frame, then $\gamma_C$ may be large and $\gamma_P$ may be small. We call M the scene change strength metric. The ratio $$\frac{\gamma_C}{\gamma_P}$$

can be used instead of $\gamma_C$ alone so that the metric is normalized to the activity level of the context.

Figure 12:
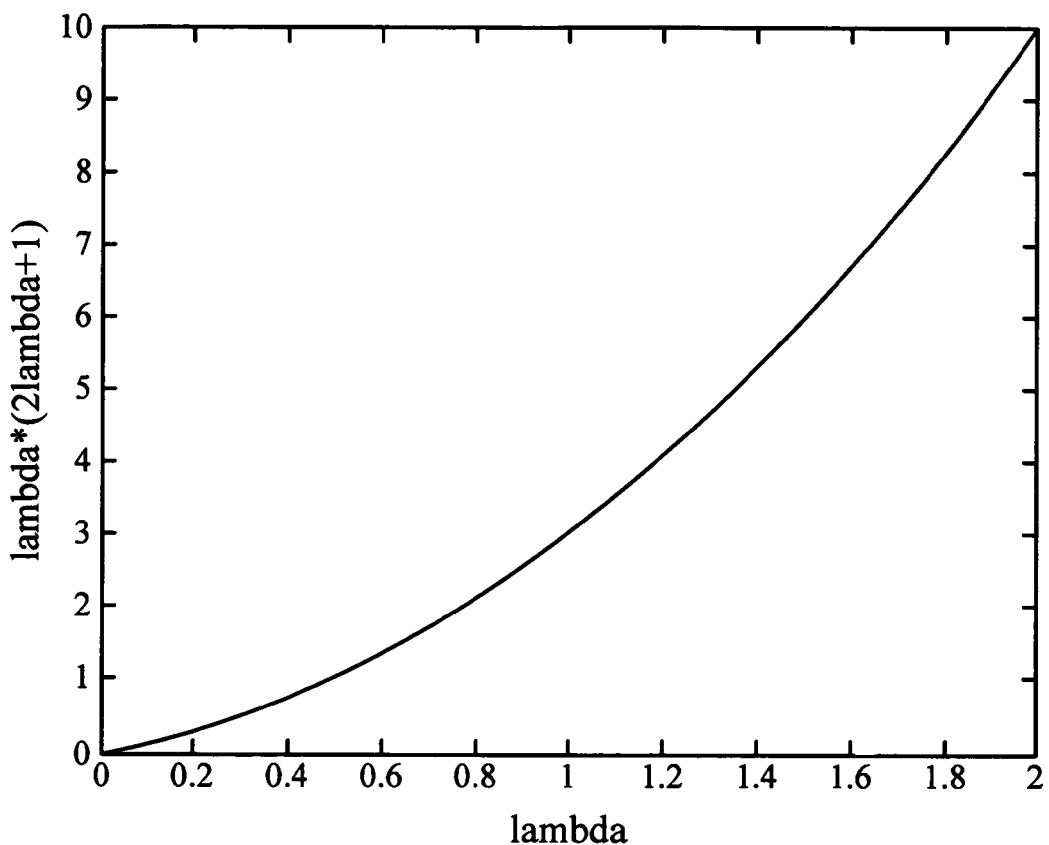
FIG. 12 is a graph illustrating pre-emphasis of large lambda

It should be noted that the above criterion uses the luminance histogram difference $\lambda$ in a non-linear way. Referring to FIG. 12, it can be seen that this is a convex function. When $\lambda$ is small (close to zero), it is barely pre-emphasis. The larger $\lambda$ becomes, the more emphasis is conducted by the function. With this pre-emphasis, for any $\lambda$ larger than 1.4, an abrupt scene change is detected if the threshold $T_1$ is set to be 5.

Cross-fading and other slow scene changes are detected if $T_2 \leq M < T_1$ for a certain number of continuous frames, where $T_2$ is a threshold To detect camera flashlight events, we can use the luminance histogram statistics. For example, a flashlight event usually causes the luminance histogram to shift to brighter side. The next criterion can be imposed to detect camera flashlight events $$\overline{Y}_C - \overline{Y}_P \geq T_3,\ \overline{Y}_C - \overline{Y}_N \geq T_3,\ \text{and}\ SAD_P \geq T_4,\ SAD_N \geq T_4 \qquad \text{(Eq. 4)}$$

$T_4$=30 achieve good detection performance. The reason to include SAD values is that camera flashes typically take one frame, and due to the luminance difference, this frame cannot be predicted well using motion compensation from both the forward and the backward direction.

Referring again to FIG. 1, although the content classification component 190 can include functionality to calculate motion vectors and the sum of absolute pixel differences, typically other encoder components can calculate this information and provide this data to the content classification component 190. The $D_{csat}$ values may also be calculated by the complexity component 192 or another component of the encoder 105 or the processor 187.

Alternatively, contrast ratios can be used in determining the spatial complexity of a frame. First, contrast ratios for each macroblock in a frame, are calculated. The contrast ratio for a given macroblock is calculated based on its average luminance with respect to its neighboring macroblocks. FIG. 5 illustrates a group of nine macroblocks in a video frame where each macroblock is 16×16 pixels. $\mu_i$ represents the mean for a given macroblock 1-9. The contrast ratio calculation for macroblock five ($CR_5$), the center macroblock block, is calculated using the following formula:

$$CR_5 = [\Sigma(\mu_i - \mu_5)/\Sigma\mu_i] * MBLUMA_5 \text{ where } i=1,2\ldots 9 \qquad \text{(Eq. 5)}$$

where $MBLUMA_5$ represents the mean luminance contrast for macroblock five. The contrast ratio for macroblocks 1-4 and 6-9 are calculated in a similar manner. The contrast ratio of a frame is obtained by taking the mean of the contrast ratio values of each of the nine macroblocks in the frame. The standard deviation of the contrast ratios of the nine macroblocks is also calculated and provides an indication of the amount of variation of texture within each frame.

Determining a Content Classification Metric

A content classification metric can be determined using contrast ratio values, their standard deviation, and a frame difference metric.

Frame Difference Metric

The other input for the content classification module is the Frame Difference metric calculated in the preprocessor. The Frame difference metric gives a measure of the difference between two consecutive frames taking into account the amount of motion (example, motion vector or MV) along with the residual energy represented as sum of absolute difference (SAD) between the predictor and the current macroblock (FIG. 3, component 325). Frame difference also provides a measure of bidirectional or unidirectional prediction efficiencies.

One example of a frame difference metric based on the motion information received from a pre-processor potentially performing motion compensated deinterlacing is as follows. The deinterlacer performs a bidirectional motion estimation and thus bidirectional motion vector and SAD information is available.

Frame difference represented by SAD_MV for each macroblock can be derived as follows:

$$SAD\_MV = \log_{10}[SAD * \exp(-\min(1, MV))] \qquad \text{(Eq. 6)}$$

where MV=Square_root $(MV_x^2 + MV_y^2)$, SAD=min($SAD_N$, $SAD_P$), where $SAD_N$: is the SAD computed from the backward reference frame, and $SAD_P$: is the SAD computed from the forward reference frame.

One another approach of estimating frame difference is by calculating a metric, gamma as follows:

$$\gamma = \frac{\varepsilon + SAD_P}{\varepsilon + SAD_N} \qquad \text{(Eq. 7)}$$

where $SAD_P$ and $SAD_N$ are the SAD of the forward and the backward difference metric respectively. It should be noted that the denominator contains a small positive number $\varepsilon$ to prevent the "divide-by-zero" error. The nominator also contains an $\varepsilon$ to balance the effect of the unity in the denominator.

We also find the luminance histogram of every frame. Normally we deal with images whose luminance depth is eight bits. For this luminance depth, we can set the number of bins to be 16 to obtain the histogram. The next metric evaluates the histogram difference $$\lambda = \frac{\sum_{i=1}^{16} |N_{Pi} - N_{Ci}|}{N} \qquad \text{(Eq. 8)}$$

where $N_{Pi}$ is the number of blocks in the $i^{th}$ bin for the previous frame, and $N_{Ci}$ is the number of blocks in the $i^{th}$ bin for the current frame, and N is the total number of blocks in a frame. Obviously, if the histogram of the previous and the current frame are disjoint, then $\lambda$=2.

We calculate a frame difference metric as shown in Eq. 9:

$$D = \left(\frac{\gamma_C}{\gamma_P} + \lambda(2\lambda+1)\right) \quad \text{(Eq. 9)}$$

Classification Procedure

The Contrast Ratio values and the Frame Difference values are utilized in the following manner to obtain a final video content classification metric, which could reliably predict the features in a given video sequence. The proposed algorithm can be able to classify the content into eight possible classes, similar to the classification obtained from the R-D curve based analysis.

The algorithm outputs a value in the range between 0 and 1 for each superframe depending on the complexity of the scene and the number of scene change occurrences in that superframe.

The content classification module in the preprocessor would execute the following steps for each superframe to obtain the content classification metric from the frame contrast and frame difference values.

(1) Calculate Mean Frame Contrast and Frame Contrast Deviation from the macroblock contrast values.

(2) Frame contrast and frame difference values are normalized using the values obtained from simulations which are 40 and 5 respectively.

(3) The generalized equation used for the computation of the Content Classification Metric is:

$CC$Metric$=CCW1*I\_$Frame$\_$Contrast$\_$Mean$+$
  $CCW2*$Frame$\_$Difference$\_$Mean$-$
  $CCW3*I\_$Contrast$\_$Deviation$^2$*exp
  $(CCW4*$Frame$\_$Difference$\_$Deviation$^2)$ (Eq. 10)

where CCW1, CCW2, CCW3 and CCW4 are weighting factors. The values are chosen to be 0.2 for CCW1, 0.9 for CCW2, 0.1 for CCW3 and −0.00009 for CCW4.

(4) Determine the number of scene changes in the super frame. Depending upon the number of scene changes, one of the following cases gets executed.

(a) No Scene Changes: When there are no scene changes in a super frame, the metric is entirely dependent on the frame difference values as shown in the following equation:

$CC$Metric$=(CCW2+(CCW1/2))*$Frame$\_$
  Difference$\_$Mean$-(CCW3-(CCW1/2))*1*$exp$(-$
  $CCW4*$Frame$\_$Difference$\_$Deviation$^2)$ (Eq. 11)

(b) Single Scene Change: When there is a single scene change frame observed in the superframe, the default equation would be used to compute the metric, as shown below:

$CC$Metric$=CCW1*I\_$Frame$\_$Contrast$\_$Mean$+$
  $CCW2*$Frame$\_$Difference$\_$Mean$-$
  $CCW3*I\_$Contrast$\_$Deviation$^2$*exp
  $(CCW4*$Frame$\_$Difference Deviation$^2)$ (Eq. 12)

(c) Two Scene Changes: When it is observed that there are at most 2 scene changes in the given superframe, the last superframe is accorded more weight than the first one as the first one would be anyway refreshed by the latter quickly, as shown in the following equation:

$CC$Metric$=0.1*I\_$Frame$\_$Contrast$\_$Mean1$+$
  $CCW1*I\_$Frame$\_$Contrast$\_$Mean2$+$
  $(CCW2-0.1)*$Frame$\_$Difference$\_$Mean$-$
  $CCW3*I\_$Contrast$\_$Deviation1$^2$*
  $I\_$Contrast$\_$Deviation2$^2$*exp
  $(CCW4*$Frame$\_$Difference$\_$Deviation$^2)$ (Eq. 13)

(d) Three or more Scene Changes: If the given superframe is observed to have more than 3 I frames (say N), the last I frame is given more weight and all other I frames are given a weight of 0.05, as shown in the following equation:

$CC$Metric$=0.05*I\_$Frame$\_$Contrast$\_$Mean$_{(1\ldots N-1)}+$
  $CCW1*I\_$Frame$\_$Contrast$\_$Mean$_{(N)}+(CCW2-$
  $(0.05*(N-1)))*$Frame$\_$Difference$\_$Mean$-$
  $CCW3*I\_$Contrast$\_$
  Deviation$_{(N)}{}^2*$
  $I\_$Contrast$\_$Deviation$_{(1\ldots N-1)}{}^2*$exp
  $(CCW4*$Frame$\_$Difference$\_$Deviation$^2)$ (Eq. 14)

(5) A correction is required for the metric in the case of low motion scenes when the Frame Difference mean is less than 0.05. An offset of (CCOFFSET) 0.33 would be added to the CCMetric.

The complexity component 192 uses the $D_{csat}$ value, motion vectors and the sum of absolute differences to determine a value indicating a spatial complexity for the macroblock (or designated amount of video data). The temporal complexity is determined by a measure of the Frame Difference Metric. The Frame Difference Metric measures the difference between two consecutive frames taking into account the amount of motion (with motion vectors) and the sum of absolute differences between the frames.

Bandwidth Map Generation

Human visual quality V can be a function of both encoding complexity C and allocated bits B (also referred to as bandwidth). It should be noted that the encoding complexity metric C considers spatial and temporal frequencies from the human vision point of view. For distortions more sensitive to human eyes, the complexity value is correspondingly higher. It can typically be assume that V is monotonically decreasing in C, and monotonically increasing in B.

To achieve constant visual quality, a bandwidth ($B_i$) is assigned to the $i^{th}$ object (frame or MB) to be encoded that satisfies the criteria expressed in Equations 15 and 16.

$$B_i = B(C_i, V) \quad \text{(Eq. 15)}$$

$$B = \sum_i B_i \quad \text{(Eq. 16)}$$

In Equations 15 and/or 16, $C_i$ is the encoding complexity of the $i^{th}$ object, B is the total available bandwidth, and V is the achieved visual quality for an object. Human visual quality is difficult to formulate as an equation. Therefore, the above equation set is not precisely defined. However, if it is assumed that the 3-D model is continuous in all variables, bandwidth ratio ($B_i/B$) can be treated as unchanged within the neighborhood of a (C, V) pair. The bandwidth ratio $\beta_i$ is defined in Equation 17.

$$\beta_i = B_i/B \quad \text{(Eq. 17)}$$

The bit allocation problem can then be defined as expressed in Equation 18:

$$\beta_i = \beta(C_i) \quad \text{(Eq. 18)}$$
$$1 = \sum_i \beta_i, \text{ for } (C_i, V) \in \delta(C_0, V_0)$$

In the Equation 18 above, δ indicates the "neighborhood."

The encoding complexity is affected by human visual sensitivity, both spatial and temporal. Girod's human vision model is an example of a model that can be used to define the spatial complexity. This model considers the local spatial frequency and ambient lighting. The resulting metric is called $D_{csat}$. At a pre-processing point in the process, whether a picture is to be Intra-coded or Inter-coded is not known and bandwidth ratios for both are generated. For Intra-coded pictures, the bandwidth ratio is expressed in Equation 19:

$$\beta_{INTRA} = \beta_{0INTRA} \log_{10}(1 + \alpha_{INTRA} Y^2 D_{csat}) \quad \text{(Eq. 19)}$$

In the equation above, Y is the average luminance component of an MB, $\alpha_{INTRA}$ is a weighing factor for the luminance square and $D_{csat}$ term following it, $\beta_{0INTRA}$ is a normalization factor to guarantee $$1 = \sum_i \beta_i.$$

For example, a value for $\alpha_{INTRA}=4$ achieves good visual quality. The value of scaling factor $\beta_{0INTRA}$ is not important so long as bits are allocated according to the ratio between $\beta_{INTRA}$ of different video objects.

To understand this relationship, it should be noted that bandwidth is allocated logarithmically with encoding complexity. The luminance squared term reflects the fact that coefficients with larger magnitude use more bits to encode. To prevent the logarithm from getting negative values, unity is added to the term in the parenthesis. Logarithms with other bases can also be used.

The temporal complexity is determined by a measure of the Frame Difference Metric. The Frame Difference Metric measures the difference between two consecutive frames taking into account the amount of motion (with motion vectors) along with the SAD.

Bit allocation for Inter-coded pictures needs to consider spatial as well as temporal complexity. This is expressed below in Equation 20:

$$\beta_{INTER} = \beta_{0INTER} \log_{10}(1 + \alpha_{INTER} \cdot SSD \cdot D_{csat} \exp(-\gamma \|MV_P + MV_N\|^2)) \quad \text{(Eq. 20)}$$

In Equation 20, $MV_P$ and $MV_N$ are the forward and the backward motion vectors for the current MB. It can be noted that $Y^2$ in the INTRA formula is replaced by SSD, which stands for sum of squared difference.

To understand the role of $\|MV_P + MV_N\|^2$ in the Equation 6, note the next characteristics of human visual system: areas undergoing smooth, predictable motion (small $\|MV_P + MV_N\|^2$) attract attention and can be tracked by the eye and typically cannot tolerate any more distortion than stationary regions. However, areas undergoing fast or unpredictable motion (large $\|MV_P + MV_N\|^2$) cannot be tracked and can tolerate significant quantization. Experiments show that $\alpha_{INTER}=1$, $\gamma=0.001$ achieves good visual quality.

Determining Texture and Motion Values

For each macroblock in the multimedia data, the classification component 194 associates a texture value with the spatial complexity and a motion value with the temporal complexity. The texture value relates to the luminescence values of the multimedia data, where a low texture value indicates small changes in luminescence values of neighboring pixels of the data, and a high texture value indicates large changes in the luminescence values of neighboring pixels of the data. According to one aspect, once the texture and motion values are calculated, a classification component 194 determines a content classification metric (e.g., a content classification) by considering both the motion and texture information. The classification component 194 associates the texture for the video data being classified with a relative texture value, for example, "Low" texture, "Medium" texture, or "High" texture, which generally indicates the complexity of luminance values of the macroblocks. Also, the classification component 194 associates the motion value calculated for the video data being classified with a relative motion value, for example, "Low" motion, "Medium" motion, or "High" motion which generally indicates the amount of motion of the macroblocks. In alternative embodiments, fewer or more categories for motion and texture can be used. Then, a content classification metric is then determined by considering the associated texture and motion values.

FIG. 6 illustrates an example of a classification chart that illustrates how texture and motion values are associated with an content classification. A person of ordinary skill in the art is familiar with many ways to implement such a classification chart, for example, in a look-up table or a database. The classification chart is generated based on predetermined evaluations of video data content. To determine the video data classification, a texture value of "Low," "Medium," or "High" (on the "x-axis") is cross-referenced with a motion value of "Low," "Medium," or "High" (on the "y-axis"). A content classification indicated in the intersecting block is assigned to the video data. For example, a texture value of "High" and a motion value of "Medium" results in a classification of seven (7). FIG. 6 illustrates various combinations of relative texture and motion values that are associated with eight different content classifications, in this example. In some other embodiments, more or fewer classifications can be used.

Bit Rate Determination

As described above, the resulting multimedia data content classification can be used in pre-/post processing and compression algorithms to effectively improve the bit management while maintaining a constant the perceptive quality of video. For example, the classification metric can be used in algorithms for scene-change detection, encoding bit rate allocation control, and frame rate up conversion (FRUC). Compressor/decompressor (codec) systems and digital signal processing algorithms are commonly used in video data communications, and can be configured to conserve bandwidth, but there is a trade-off between quality and bandwidth conservation. The best codecs provide the most bandwidth conservation while producing the least degradation of video quality.

In one aspect, a bit rate component 196 uses the content classification to determine a bit rate (e.g., the number of bits allocated for encoding the multimedia data) and stores the bit rate into memory for use by other process and components, for example, encoder component 185 in FIG. 1. A bit rate determined from the classification of the video data can help conserve bandwidth while providing multimedia data at a consistent quality level. In one aspect, a different bit rate can be associated with each of the eight different content classifications and then that bit rate is used to encode the multimedia data. The resulting effect is that although the different content classifications of multimedia data are allocated a different number of bits for encoding, the perceived quality is similar or consistent when viewed on a display.

Generally, multimedia data with a higher content classification are indicative of a higher level of motion and/or texture and is allocated more bits when encoded. Multimedia data with a lower classification (indicative of less texture and motion) is allocated less bits. For multimedia data of a particular content classification, the bit rate can be determined based on a selected target perceived quality level for viewing the multimedia data. Determining multimedia data quality can be determined by humans viewing and grading the multimedia data. In some alternative embodiments, estimates of the multimedia data quality can be made by automatic test systems using, for example, signal to noise ratio algorithms.

In one aspect, a set of standard quality levels (e.g., five) and a corresponding bit rate needed to achieve each particular quality level are predetermined for multimedia data of each content classification. To determine a set of quality levels, multimedia data of a particular content classification can be evaluated by generating a Mean Opinion Score (MOS) that provides a numerical indication of a visually perceived quality of the multimedia data when it is encoded using a certain bit rate. The MOS can be expressed as a single number in the range 1 to 5, where 1 is lowest perceived quality, and 5 is the highest perceived quality. In other embodiments, the MOS can have more than five or fewer than five quality levels, and different descriptions of each quality level can be used.

Determining multimedia data quality can be determined by humans viewing and grading the multimedia data. In some alternative embodiments, estimates of the multimedia data quality can be made by automatic test systems using, for example, signal to noise ratio algorithms. In one aspect, a set of standard quality levels (e.g., five) and a corresponding bit rate needed to achieve each particular quality level are predetermined for multimedia data of each content classification.

Knowing the relationship between the visually perceived quality level and a bit rate for multimedia data of a certain content classification can be determined by selecting a target (e.g., desired) quality level. The target quality level used to determine the bit rate can be preselected, selected by a user, selected through an automatic process or a semi-automatic process requiring an input from a user or from another process, or be selected dynamically by the encoding device or system based on predetermined criteria. A target quality level can be selected based on, for example, the type of encoding application, or the type of client device that would be receiving the multimedia data.

Determination of Content Classifications

Content classification curves, and the rate-distortion curves from which they are derived are generated prior to classifying the video data. For the identified multimedia data classifications, the acceptable bit rate is determined by finding the point of intersection of the target quality level with the particular rate distortion quality curve for the particular classification of video data. The bit rate is the point that corresponds to the intersection point, and the bit rate may decrease as a lower target quality level is selected. For example, if the target quality level was selected to be "Acceptable" instead of "Good," encoding video data classified as, for example, class 6 with a bit rate of Rate 5, may now require a bit rate of about Rate 4.

Figure 7:
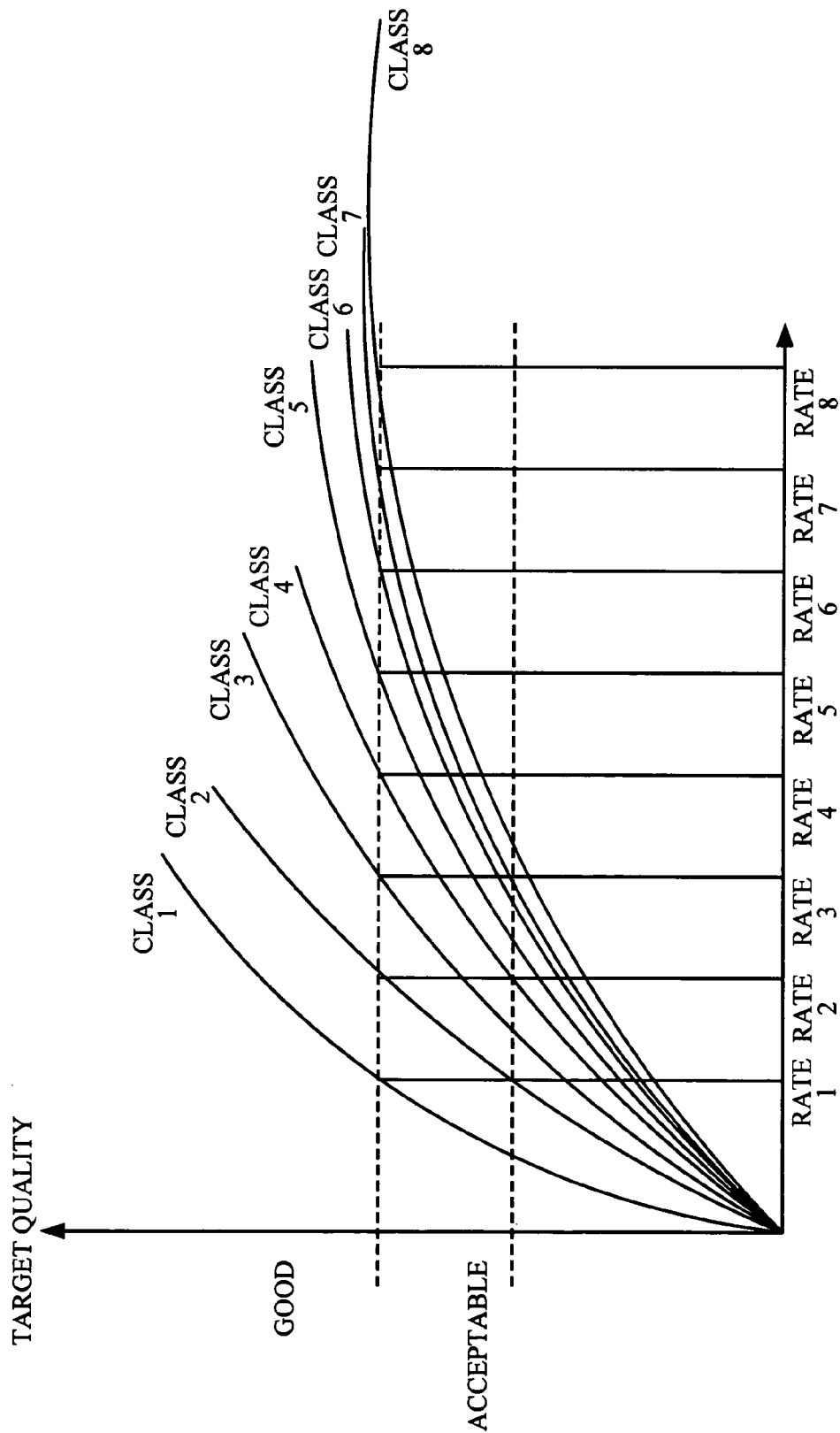

To determine the eight multimedia data content classifications referenced in FIGS. 6 and 7, multimedia data sequences containing varying types of content can be used to obtain average bit rates and average luminance peak signal-to-noise ratio (PSNR). The average bit rates for the sequences are plotted against the average PSNR forming rate-distortion (R-D) curves. For example, R-D curves for numerous multimedia data sequences can be depicted in graphical format where the x-axis is the average bit rate (kbps), and the y-axis is average luminance PSNR (db). The R-D curves for the sequences fall into several different clusters, and the multimedia data sequences are then classified into different groups (also curves) based on the clusters of the R-D curves. In one example, five groups are initially formed with each group obtained by taking the mean of all the sequences falling into that cluster. The clusters can each include one or more sequences. The standard deviation for each group can also be calculated from the particular sequences forming the group. In other examples, the video data sequences may cluster to form less than five groups or more than five groups depending on the sequences used. In this example, the number of groups (five) are subsequently increased based on further analysis of the video data. Similarly, if more or fewer groups are initially formed in some other aspects, such aspects may also include further increasing or decreasing the number of groups based on evaluating additional sequences. The five initial groups correspond to five classes which represent varying levels of motion and texture in a given superframe. For example, class 1 represents a superframe having low motion and low texture (LM,LT), class 2 represents a superframe having medium motion and low texture (MM,LT), class 3 represents a superframe having medium motion and medium texture (MM, LT), class 4 represents a superframe having high motion and medium texture (HM, MT) and class 5 represents a superframe having high motion and high texture (HM,HT).

Next, each superframe from all the available source sequences is classified to test if each superframe falls into its respective class. The initial classification can be refined by testing various sequences of multimedia data and using an iterative process to accommodate the various other sequences that do not fit into the previously defined five groups, and a new set modified R-D curves can be obtained. In this example, the number of clusters was increased from five to eight and additional classes were formed, where the larger class number represents increasing motion and a higher level of texture in the multimedia data.

In this example, these R-D curves were then modeled to facilitate their use in classifying multimedia data. Because the relationship between the bit rate and the Luminance PSNR of a signal is a logarithmic function, the R-D curves can be modeled using a logarithmic function of the following form, ypsnr=a*ln (rate)+b, a>0. In this example, the values of parameters a and b are reproduced below:

| Class | a | b |
|---|---|---|
| 1 | 5.0874 | −13.038 |
| 2 | 5.1765 | −20.790 |
| 3 | 5.9369 | −32.149 |
| 4 | 5.2884 | −27.498 |
| 5 | 5.3435 | −30.421 |
| 6 | 5.1642 | −29.173 |
| 7 | 5.0773 | −32.890 |
| 8 | 5.0813 | −37.631 |

A multimedia processing system designed to operate in such a way that all the real-time services have similar perceived quality irrespective of their bit rate assignment provide consistent multimedia data for display. Hence, a quality metric (e.g., PSNR) for a real time service is expected to be monotonically increasing with the assigned bit rate. Because an equal value of PSNR does not necessarily produce a perceived consistent quality of multimedia data, the existing classes were modified based on another quality metric, other than PSNR. To achieve the same perceived quality of the multimedia data, the content classification curves were modified by adding corresponding offsets so that all the classes have a similar quality metric. The offset corrected equations are also of logarithmic form, ypsnr=a*ln (rate)+b+offset. In the described example, the offset values for each of the eight content classes are −9.833, −5.831, −4.335, −2.064, −0.127, 0.361, 4.476 and 6.847.

One use of content classification is for video data scene-change detection. If the frame difference metric or the contrast ratio value or the content classification metric are relatively high with respect to the previous and future frame in a sequence of frames, we determine that the particular frame is a scene change or a new shot.

Figure 8:
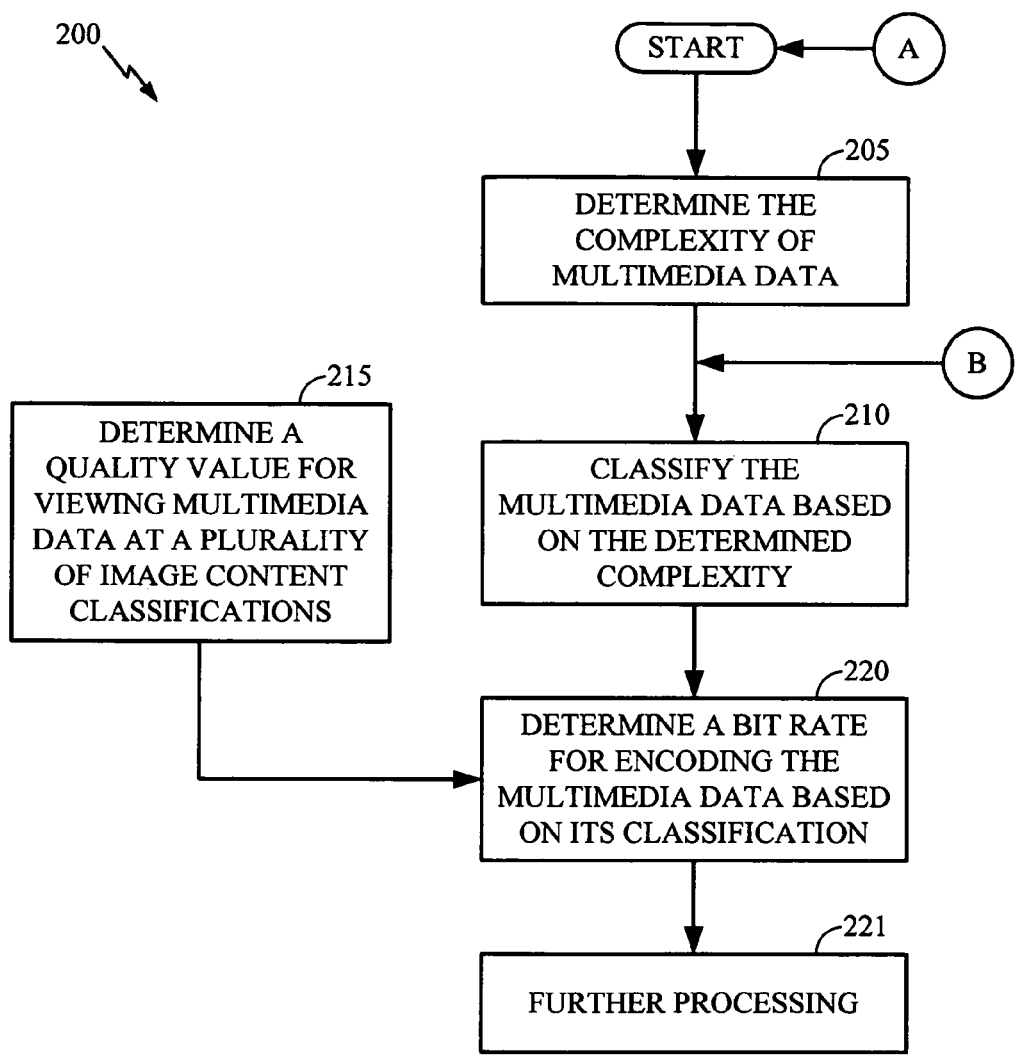

FIG. 8 is a flowchart illustrating one example of a process 200 for determining a bit rate based on classifying multimedia data. It is also noted that examples may be described as a process which can be depicted as a flowchart, a flow diagram, a structure diagram, or a block diagram. Although a flowchart may describe the operations as a sequential process, many of the operations can be performed in parallel or concurrently and the process can be repeated. In addition, the order of the operations may be re-arranged, operations not shown may be performed, or operations shown may be omitted depending on circumstances of an application of the process.

A process described herein may correspond to a method, a function, a procedure, a software program, or part of a software program. When a process corresponds to a function, its termination corresponds to a return of the function to the calling function or the main function. The description of a process as a software program, module, component, subroutine, or a subprogram is a broad description and is not intended to require all embodiments to be implemented identically, unless expressly stated as such. Instead, one skilled in the art will recognize that such operations can typically be implemented in hardware, software, middleware, firmware, or microcode. Functionality or an operation that is described as a single component, program, or module may also be implemented in two or more components, modules, programs, e.g., submodules, subprograms or subroutines.

Process 200 can be carried out by, for example, encoder device 105, and the components thereof, shown in FIG. 1. Encoded or non-encoded video data is received by the encoder device 105 from the external source 135. In process 200, step 205 determines the complexity of the video data. In some embodiments, the encoder component 185 calculates information used to determine the spatial complexity and the temporal complexity of the video data, for example, motion vectors, at least one $D_{csat}$ values, and sum of the absolute differences of macroblocks. In some embodiments, the content classifying component 190 calculates at least part of the information needed to determine the multimedia data temporal and spatial complexity. Classifying means such as the content classifying component 190 can classify the multimedia data based on the determined complexity, step 210. As a result of step 210, the multimedia data is classified in one of several content classifications (e.g., one of eight content classifications). In step 215, the process 200 determines a quality value for viewing multimedia data at a plurality of content classifications, which is typically done prior to the start of process 200. Determining a data quality level can be determined by humans viewing and grading the multimedia data, or, in some alternative embodiments, estimates of the multimedia data quality can be made by automatic data evaluation systems using, for example, signal to noise ratio algorithms. The quality level can be preselected, selected by a user, selected through an automatic process or a semi-automatic process requiring an input from a user or from another process. Alternatively the quality level can be selected dynamically by the encoding device or system during the operation of the system, based on, for example, predetermined criteria relating to a desired or required quality level for viewing the multimedia data.

The process 200 determined a bit rate for encoding the video data based on its classification and desired target quality level. The bit rate for encoding the video data can be determined by adding the individual frame size estimates belonging to that superframe. The individual frame size estimates can be computed in two ways. In one approach, the estimate of the sizes of each frame in the superframe is computed based on the bandwidth ratios and then the size of the superframe can be estimated as a linear combination of the frame sizes.

Estimating Superframe Size Based on Frame Sizes

The frame sizes are estimated depending on the previously encoded frames and the Bandwidth ratios of the frame. We used an Infinite Impulse Response (IIR) filter to estimate the frame sizes and a strong correlation is observed between the actual size and the estimated sizes from the simulations. The Bandwidth ratios (BWR) are calculated in the preprocessor based on the motion vectors and the SAD in the MPEG-2 decoder.

We assume a straight-forward linear relationship between the frame size and the BWR as follows:

$$\text{Frame Size}(n)/BWR(n) = \text{Frame Size}(n+1)/BWR(n+1) \quad \text{(Eq. 20)}$$

A procedure for estimating the frame sizes is described hereinbelow.

(1) A quantity called Gamma is calculated as the ratio between the Frame Size and the BWR for each encoded frame.

$$\text{Gamma}(i) = \text{Frame Size}(i)/\text{Temporal\_BWR}(i) \quad \text{(Eq. 21)}$$

(2) For each frame to be encoded, a weight is calculated using the following IIR filter $$\text{Gamma}p(i) = (1-\text{alpha})*\text{Gamma}(i-1) + \text{alpha}*\text{Gamma}p(i-1) \quad \text{(Eq. 22)}$$

Hence the frame size is estimated as follows:

$$\text{Frame Estimate}(i) = \text{Gamma}p(i)*\text{Temporal\_BWR}(i) \quad \text{(Eq. 23)}$$

This procedure can be used for both the P and B frames with successive P frames estimated from the previous encoded P frames and B frames estimated from previous encoded B frames. In one approach, Temporal_BWR may be the sum of Beta_inter (described above) for all macroblocks in the frame. In the case of I frames, it is observed that an FIR filter provides a more accurate results than with an IIR filter. Hence for I frames, the estimate is obtained as follows:

$$I \text{ Frames Estimate}(i) = \text{Spatial\_BWR}(i)*(I\_\text{Frame Size}(i-1)/\text{Spatial\_BWR}(i-1)) \quad \text{(Eq. 24)}$$

The superframe size is the sum of all the frame estimates in that superframe.

Estimating the Superframe Size as a Whole

In another approach, the super frame size can be estimated as a whole. The superframe size can be estimated depending on the previously encoded super frames and the Bandwidth ratios of the super frame as a whole. An Infinite Impulse Response (IIR) filter as described for the first approach above can be used to estimate the super frame sizes.

Again a linear relationship can be assumed between the superframe size and the superframe complexity represented by means of bandwidth ratio for the superframe as a whole:

$$SF\_\text{Size}(n)/SF\_BWR(n) = SF\_\text{Size}(n+1)/SF\_BWR(n+1) \quad \text{(Eq. 25)}$$

The procedure for estimating the super frame sizes can be explained as follows:

(1) A quantity called Theta is calculated as the ratio between the super frame Size and the BWR for the complete super frame, as shown in the following equation:

$$\text{Theta}(i) = SF\_\text{Size}(i)/SF\_BWR(i) \quad \text{(Eq. 26)}$$

(2) For each superframe to be encoded, a weight is calculated using the following IIR filter.

$$\text{Theta}P(i)=(1-\text{alpha})*\text{Theta}(i-1)+\text{alpha}*\text{Theta}P(i-1) \quad \text{(Eq. 27)}$$

The super frame size can be estimated as follows:

$$\text{SuperFrame\_Estimate}(i)=\text{Theta}P(i)*SF\_BWR(i) \quad \text{(Eq. 28)}$$

The bandwidth ratio for a given superframe is estimated using a linear combination of the bandwidth ratios for the individual frames in that superframe. Frame types in a superframe can be based on a fixed GOP structure such as IBP or IBBP etc.

The frame types in a superframe are determined based on the frame difference metric described above. An intra threshold and an inter threshold are determined based on classification of the content type in this given superframe. Based on these thresholds, a frame is declared as an I-frame if its frame difference exceeds intra_threshold or a P-frame if its frame difference is between the intra and inter thresholds and a B-frame if the frame difference is below the inter_threshold.

Spatial bandwidth ratio, described as Beta_Intra derived using Dcsat and Girod's model described above is used to estimate the size of Intra frames. Another approach is where the spatial bandwidth ratio is based on the contrast ratio described above or any other metric that represents the amount Temporal bandwidth ratio, described as Beta_Inter derived using Dcsat and Girod's model and MV and SAD described above is used to estimate the size of inter. Another approach is where the temporal bandwidth ratio is based on the SAD_MV metric described above or any other metric that represents the amount or level of motion in the frame.

Referring again to FIG. 8, in step 221 process 200 uses the bit rate determined in step 215 for further processing of the multimedia data, for example, to encode the multimedia data for communication along a wireless network.

Figure 9:
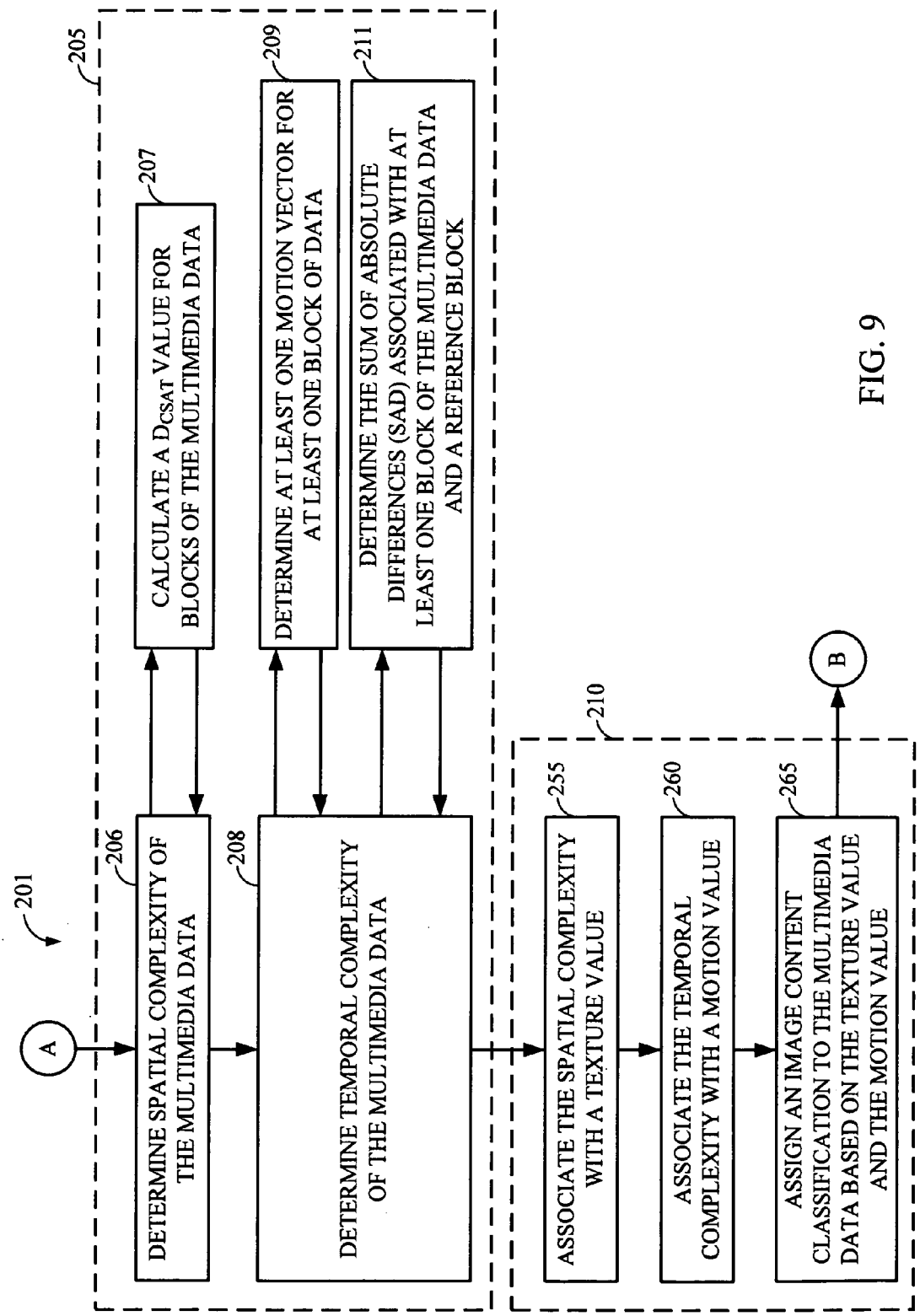

FIG. 9 is a flowchart illustrating a process 201 for further operations of processing multimedia data between the points "A" and the "B" shown in FIG. 8. Process 201 determines the spatial complexity of the multimedia data in step 206. Determining the spatial complexity requires the process 201 to calculate at least one $D_{csat}$ value for blocks of the multimedia data, which is performed in step 207. Step 207 can be performed by the encoder component 185 or the content classifying component 190, both shown in FIG. 1. The process of calculating a $D_{csat}$ value is described hereinabove. Proceeding to step 240, the process 201 now determines the temporal complexity of the multimedia data. Step 209 determines at least one motion vector for at least one block of data, which is typically done by the encoder component 185. In step 211, process 201 also determines the sum of absolute differences (SAD) associated with at least one block of the multimedia data and a reference block. The calculations in step 211 are also typically done by the encoder component 185. Proceeding to step 210, the process 201 classifies the multimedia data based on the determined complexity. To classify the multimedia data, the spatial complexity is associated with a texture value, in step 255. Also, the temporal complexity is associated with a motion value, as shown in step 260. Finally, in step 265 the process 201 assigns an content classification to the multimedia data based on the texture value and the motion value, determined in step 255 and 260, respectively. The steps of process 201 end at "B" which is where the process 200 would continue on to determine a bit rate, as shown in step 215 in FIG. 9.

Content classification and the process of estimating complexity of multimedia content and the corresponding encoding rate or compression ratio for a given perceptive quality can be extended to enhance gains in statistical multiplexing of variable rate streams. Such a multiplexer that exploits the methods and apparatuses described above also enable uniform quality multiplex to be output for dynamically varying content in multimedia applications. Such a multiplexer is described below.

Multiplexer

In some embodiments, a multiplexer may be used for the bit management discussed above. For example, a multiplexer may be implemented to provide the bit rate allocation control. The estimated complexity can be provided to the multiplexer, which can then allocate the available bandwidth for a collection of multiplexed video channels according to the encoding complexity anticipated for those video channels, which then permits the quality of a particular channel to remain relatively constant even if the bandwidth for the collection of multiplexed video streams is relatively constant. This provides a channel within a collection of channels to have a variable bit rate and relatively constant visual quality, rather than a relatively constant bit rate and a variable visual quality.

Figure 10:
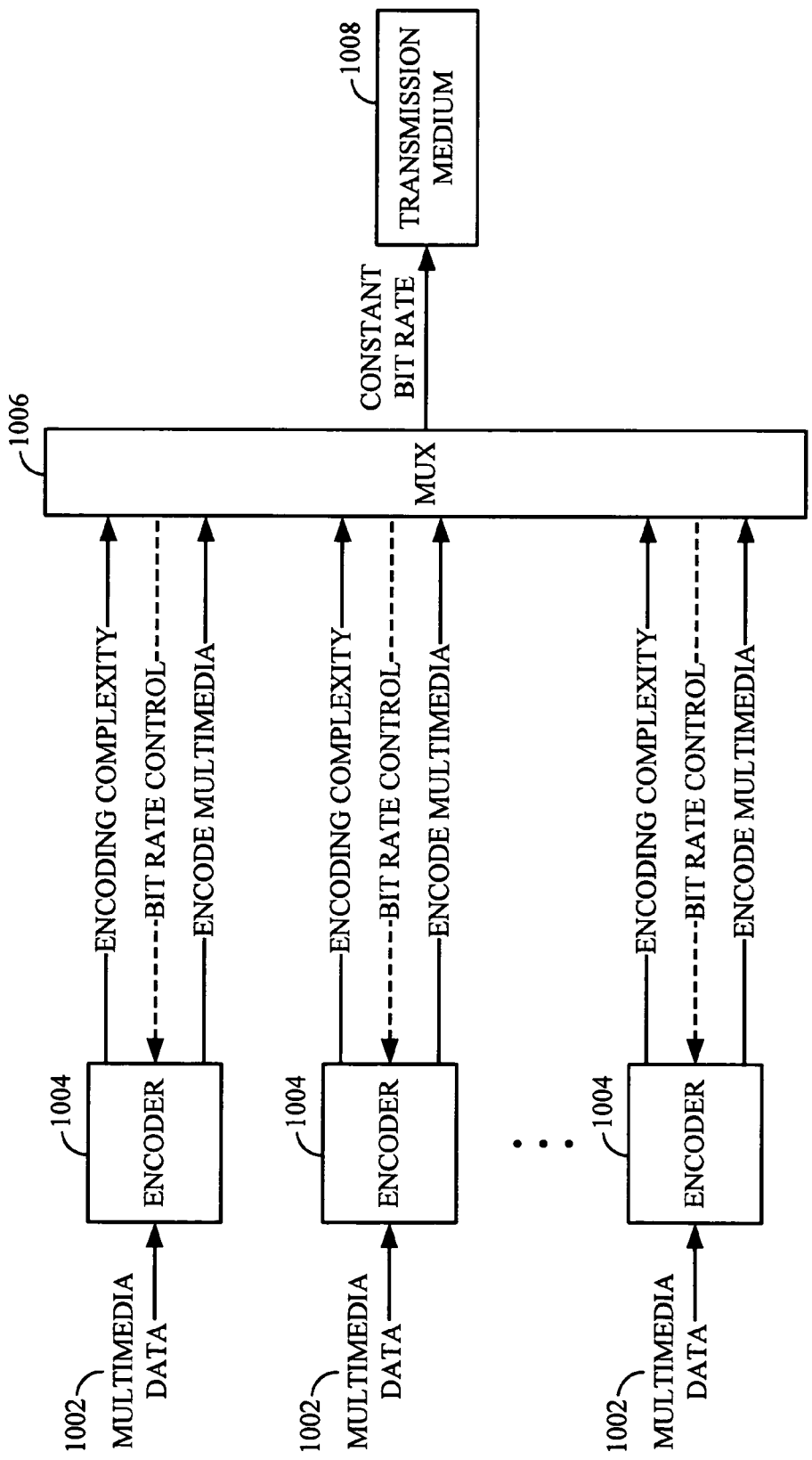
FIG. 10 is a system diagram illustrating the encoding of multiple multimedia streams or channels.

FIG. 10 is a system diagram illustrating the encoding of multiple multimedia streams or channels 1002. The multimedia streams 1002 are encoded by respective encoders 1004, which are in communication when a multiplexer (MUX) 1006, which in turn is in communication with a transmission medium 1008. For example, the multimedia streams 1002 can correspond to various content channels, such as news channels, sports channels, movie channels, and the like. The encoders 1004 encode the multimedia streams 1002 to the encoding format specified for the system. While described in the context of encoding of video streams, the principles and advantages of the disclosed techniques are generally applicable to multimedia streams including, for example, audio streams. The encoded multimedia streams are provided to a multiplexer 1006, which combines the various encoded multimedia streams and sends the combined stream to the transmission medium 1008 for transmission.

The transmission medium 1008 can correspond to a variety of mediums, such as, but not limited to, digital satellite communication, such as DirecTV®, digital cable, wired and wireless Internet communications, optical networks, cell phone networks, and the like. The transmission medium 1008 can include, for example, modulation to radio frequency (RF). Typically, due to spectral constraints and the like, the transmission medium has a limited bandwidth and the data from the multiplexer 1006 to the transmission medium is maintained at a relatively constant bit rate (CBR).

In conventional systems, the use of constant bit rate (CBR) at the output of the multiplexer 1006 requires that the encoded multimedia or video streams that are inputted to the multiplexer 1006 are also CBR. As described in the background, the use of CBR when encoding video content can result in a variable visual quality, which is typically undesirable.

In the illustrated system, two or more of the encoders 1004 communicate an anticipated encoding complexity of input data. One or more of the encoder 1004 may receive adapted bit rate control from the multiplexer 1006 in response. This permits an encoder 1004 that expects to encode relatively complex video to receive a higher bit rate or higher bandwidth (more bits per frame) for those frames of video in a quasi-variable bit rate manner. This permits the multimedia stream 1002 to be encoded with more consistent visual quality. The extra bandwidth that is used by a particular encoder 1004 encoding relatively complex video comes from the bits that would otherwise have been used for encoding other video streams 1004 if the encoders were implemented to operate at constant bit rates. This maintains the output of the multiplexer 1006 at the constant bit rate (CBR).

While an individual multimedia stream 1002 can be relatively "bursty," that is, vary in used bandwidth, the cumulative sum of multiple video streams can be less bursty. The bit rate from channels that are encoding less complex video that can be reallocated by, for example, the multiplexer 1006, to channels that are encoding relatively complex video, and this can enhance the visual quality of the combined video streams as whole.

The encoders 1004 provide the multiplexer 1006 with an indication of the complexity of a set of video frames to be encoded and multiplexed together. The output of the multiplexer 1006 should provide an output that is no higher than the bit rate specified for the transmission medium 1008. The indications of the complexity can be based on the content classification as discussed above to provide a selected level of quality. The multiplexer 1006 analyzes the indications of complexity, and provides the various encoders 1004 with an allocated number of bits or bandwidth, and the encoders 1004 use this information to encode the video frames in the set. This permits a set of video frames to individually be variable bit rate, and yet achieve constant bit rate as a group.

Content Classification can also be used in enabling quality based compression of multimedia in general for any generic compressor.

Content Classification and the methods and apparatuses described here may be used in quality based and/or content based multimedia processing of any multimedia data. One example is its use in compression of multimedia in general for any generic compressor. Another example is in decompression or decoding in any decompressor or decoder or post-processor such as interpolation, resampling, enhancement, restoration and presentation operations.

Aspects of the various embodiments may be implemented in any device that is configured to encode multimedia data for subsequent display, including multimedia data where the frames exhibited display an image in motion (e.g., a sequence of associated frames portraying a moving or changing image) or a stationary image (e.g., unchanging or slow changing image), and whether textual or pictorial. More particularly, it is contemplated that some embodiments may be implemented in or associated with a variety of electronic devices that can be used for communication such as, but not limited to, mobile telephones, wireless devices, personal data assistants (PDAs), hand-held or portable computers, and other such wired or wireless communication devices configured to receive multimedia data for display.

Communicating multimedia data to client devices, such as wireless phones, PDA's, laptop computers, etc., involves transmitting and processing large amounts of data. Most multimedia applications could have increased benefits in quality if the sequence of multimedia frames provided to the encoder is classified based on its content. There are a number of applications in a multimedia communication system where content classification, if available, can be useful. For example, the content classification can be useful in determining a bit rate needed to encode multimedia data for obtaining a predetermined viewing quality, and it can also be used to determine the best frame type for a given frame.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, and algorithm steps described in connection with the examples disclosed herein may be implemented as electronic hardware, firmware, computer software, middleware, microcode, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

The various illustrative logical blocks, components, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples would be readily apparent to those skilled in the art, and the principles defined herein may be applied to other examples and additional elements may be added without departing from the spirit or scope of the disclosed method and apparatus.

What is claimed is:

1. A method of processing multimedia data comprising:
   retrieving, from a memory device, preprocessed information related to the multimedia data;
   determining a complexity of the multimedia data from the retrieved information, wherein determining the complexity comprises determining spatial complexity and temporal complexity of the multimedia data; and classifying the multimedia data based on the determined complexity, wherein classifying the multimedia data comprises:
  associating the spatial complexity with a texture value;
  associating the temporal complexity with a motion value; and
  assigning a content classification to the multimedia data based on the texture value and the motion value;
determining a content classification curve based on the assigned content classification; and
based on a target quality level for the multimedia data and the determined content classification curve, determining a bit rate for the multimedia data.

2. The method of claim 1, wherein determining spatial complexity comprises determining at least one human visual sensitivity value for at least one block of the multimedia data.

3. The method of claim 1, wherein determining spatial complexity comprises determining at least one contrast ratio value for at least one block of the multimedia data.

4. The method of claim 1, wherein determining temporal complexity comprises determining at least one motion vector (MV) for at least one block of the multimedia data.

5. The method of claim 1, wherein determining temporal complexity further comprises associating a sum of absolute pixel differences associated with at least one block of the multimedia data and a reference block.

6. The method of claim 1, wherein determining temporal complexity comprises determining at least one frame difference value for at least one block of the multimedia data.

7. The method of claim 6, wherein the at least one frame difference value includes a SAD_MV value determined for the at least one block of the multimedia data.

8. The method of claim 1, wherein classifying the multimedia data comprises using a plurality of content classifications.

9. An apparatus for processing multimedia data comprising:
  means for retrieving, from a memory device, preprocessed information related to the multimedia data;
  means for determining a complexity of the multimedia data from the retrieved information, wherein the means for determining the complexity comprises means for determining spatial complexity and temporal complexity of the multimedia data; and
  means for classifying the multimedia data content based on the determined complexity, wherein the means for classifying the multimedia data comprises:
    means for associating the spatial complexity with a texture value;
    means for associating the temporal complexity with a motion value; and
    means for assigning a content classification to the multimedia data based on the texture value and the motion value;
  means for determining a content classification curve based on the assigned content classification;
  means for determining a bit rate for the multimedia data based on a target quality level for the multimedia data and the determined content classification curve.

10. The apparatus of claim 9, wherein the means for determining spatial complexity comprises means for determining at least one human visual sensitivity value for at least one block of the multimedia data.

11. The apparatus of claim 9, wherein the means for determining spatial complexity comprises means for determining at least one contrast ratio value for at least one block of the multimedia data.

12. The apparatus of claim 9, wherein the means for determining temporal complexity comprises means for determining at least one motion vector (MV) for at least one block of the multimedia data.

13. The apparatus of claim 12, wherein the means for determining temporal complexity further comprises means for determining a sum of absolute pixel differences associated with at least one block of the multimedia data and a reference block.

14. The apparatus of claim 9, wherein the means for determining temporal complexity comprises means for determining at least one frame difference value determined for at least one block of the multimedia data.

15. The apparatus of claim 14, wherein the at least one frame difference value is a SAD_MV value determined for at least one block of the multimedia data.

16. The apparatus of claim 9, wherein means for classifying the multimedia data content comprises a plurality of means for content classifications.

17. A non-transitory computer readable storage medium storing instructions that when executed by one or more processors cause the one or more processors to:
  determine complexity of multimedia data, wherein the one or more processors determine the complexity by determining spatial complexity and temporal complexity of the multimedia data;
  classify multimedia data based on the determined complexity, wherein classifying the multimedia data comprises:
    associating the spatial complexity with a texture value;
    associating the temporal complexity with a motion value; and
    assigning a content classification to the multimedia data based on the texture value and the motion value;
  determine a content classification curve based on the assigned content classification; and
  based on a target quality level for the multimedia data and the determined content classification curve, determine a bit rate for the multimedia data.

18. The non-transitory computer-readable storage medium of claim 17, wherein the one or more processors determine temporal complexity by determining at least one human visual sensitivity value for at least one block of the multimedia data.

19. The non-transitory computer-readable storage medium of claim 17, wherein the one or more processors determine temporal complexity by determining at least one contrast ratio value for at least one block of the multimedia data.

20. The non-transitory computer-readable storage medium of claim 17, wherein the one or more processors determine temporal complexity by determining at least one motion vector (MV) for at least one block of the multimedia data.

21. The non-transitory computer-readable storage medium of claim 17, wherein the one or more processors determine temporal complexity by associating a sum of absolute pixel differences associated with at least one block of the multimedia data and a reference block.

22. The non-transitory computer-readable storage medium of claim 17, wherein the one or more processors determine temporal complexity by determining at least one frame difference value for at least one block of the multimedia data.

23. The non-transitory computer-readable storage medium of claim 22, wherein the at least one frame difference value includes a SAD_MV value determined for the at least one block of the multimedia data.

24. The non-transitory computer-readable storage medium of claim 17, wherein the one or more processors classify the multimedia data by using a plurality of content classifications.

25. A device for processing multimedia data, the device comprising:
a memory;
one or more processors configured to:
retrieve, from the memory, preprocessed information related to the multimedia data;
determine a complexity of the multimedia data from the retrieved information, wherein determining the complexity comprises determining spatial complexity and temporal complexity of the multimedia data;
classify the multimedia data based on the determined complexity, wherein classifying the multimedia data comprises:
associating the spatial complexity with a texture value;
associating the temporal complexity with a motion value; and
assigning a content classification to the multimedia data based on the texture value and the motion value;
determine a content classification curve based on the assigned content classification; and
based on a target quality level for the multimedia data and the determined content classification curve, determine a bit rate for the multimedia data.

26. The device of claim 25, wherein the one or more processors determine temporal complexity by determining at least one human visual sensitivity value for at least one block of the multimedia data.

27. The device of claim 25, wherein the one or more processors determine temporal complexity by determining at least one contrast ratio value for at least one block of the multimedia data.

28. The device of claim 25, wherein the one or more processors determine temporal complexity by determining at least one motion vector (MV) for at least one block of the multimedia data.

29. The device of claim 25, wherein the one or more processors determine temporal complexity by associating a sum of absolute pixel differences associated with at least one block of the multimedia data and a reference block.

30. The device of claim 25, wherein the one or more processors determine temporal complexity by determining at least one frame difference value for at least one block of the multimedia data.

31. The device of claim 30, wherein the at least one frame difference value includes a SAD_MV value determined for the at least one block of the multimedia data.

32. The device of claim 25, wherein the one or more processors classify the multimedia data by using a plurality of content classifications.

* * * * *